United States Patent
Tomita et al.

(10) Patent No.: US 6,965,481 B2
(45) Date of Patent: Nov. 15, 2005

(54) ZOOM LENS AND PHOTOGRAPHING SYSTEM

(75) Inventors: Yasuyuki Tomita, Tochigi (JP); Shinichiro Yakita, Tochigi (JP)

(73) Assignee: Canon Kabushiki Kaisha (JP)

( * ) Notice: Subject to any disclaimer, the term of this patent is extended or adjusted under 35 U.S.C. 154(b) by 348 days.

(21) Appl. No.: 10/032,767

(22) Filed: Dec. 27, 2001

(65) Prior Publication Data

US 2002/0149692 A1 Oct. 17, 2002

(30) Foreign Application Priority Data

Dec. 28, 2000 (JP) .......................................... 2000-403516
Dec. 18, 2001 (JP) .......................................... 2001-384439

(51) Int. Cl.$^7$ .......................... G02B 15/14; G03B 17/00
(52) U.S. Cl. .......................................... 359/686; 396/80
(58) Field of Search .............................. 359/686, 687, 359/688, 557; 396/80

(56) References Cited

U.S. PATENT DOCUMENTS

| | | | |
|---|---|---|---|
| 5,138,492 A | 8/1992 | Hamano et al. ............ 359/684 |
| 5,521,758 A | 5/1996 | Hamano ..................... 359/557 |
| 5,758,206 A | 5/1998 | Imaoka ........................ 396/80 |
| 5,771,123 A | 6/1998 | Hamano ..................... 359/557 |
| 5,786,853 A | 7/1998 | Ohkawara et al. .......... 348/358 |

FOREIGN PATENT DOCUMENTS

EP  1 220 001 A1 * 3/2002 ........... G02B/15/14

OTHER PUBLICATIONS

Patent Abstracts of Japan, Publication No. 02 210975, Publication Date Aug. 22, 1990.
Patent Abstracts of Japan, Publication No. 04 078808, Publication Date Mar. 12, 1992.
European Search Report, Mar. 27, 2002, Application EP 0131 0870.

* cited by examiner

*Primary Examiner*—David N. Spector
(74) *Attorney, Agent, or Firm*—Morgan & Finnegan, LLP

(57) ABSTRACT

In a zoom lens in/from which a magnification changing optical unit for changing an overall focal length of the zoom lens can be inserted/removed, wherein a wobbling unit which can be slightly amplitude-driven in an optical axis direction to detect a best imaging position is placed closer to an image side than an insertion position of said magnification changing optical unit.

20 Claims, 13 Drawing Sheets

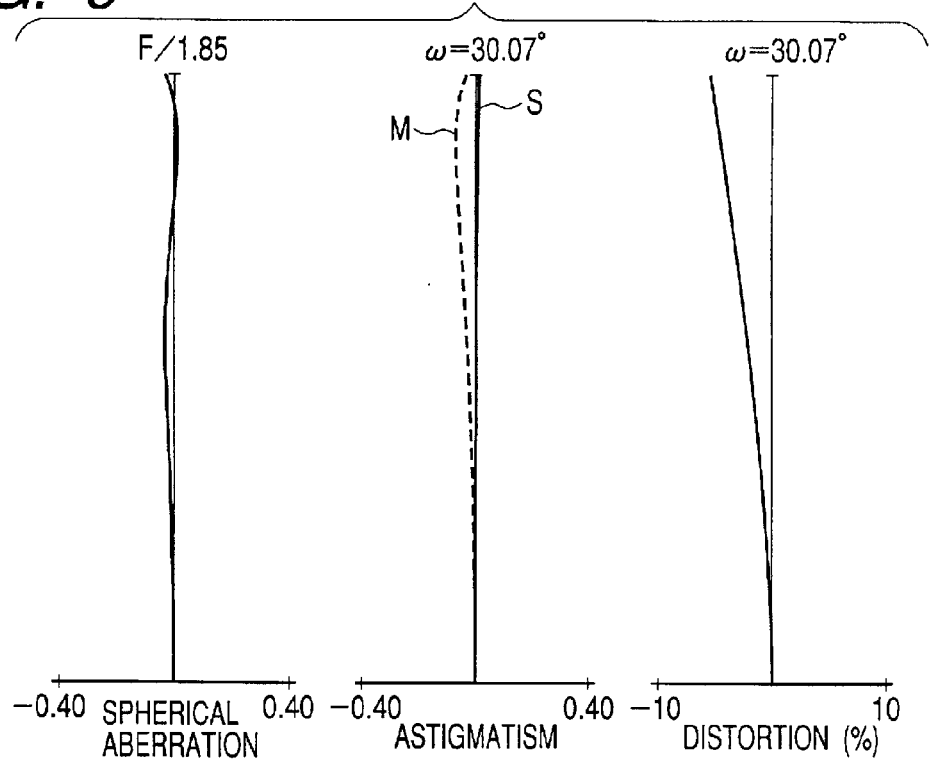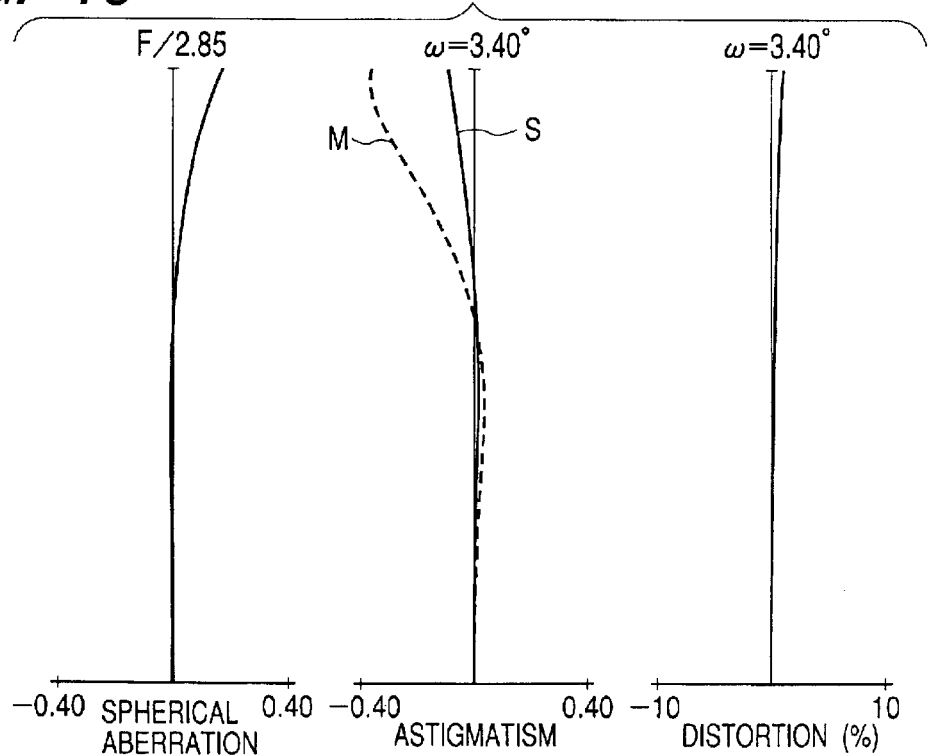

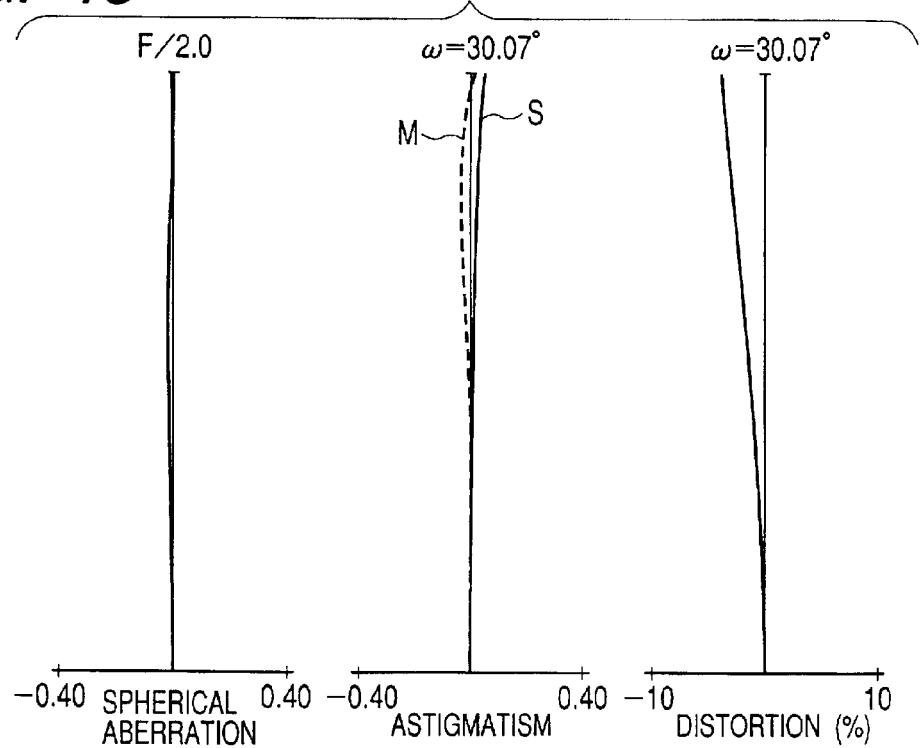
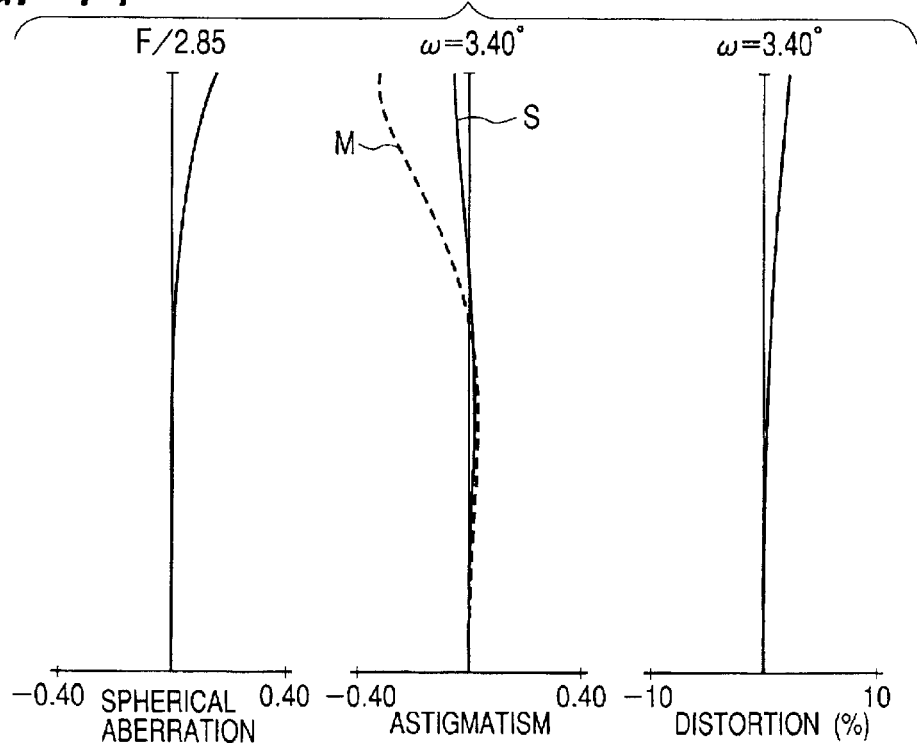

ZOOM LENS AND PHOTOGRAPHING SYSTEM

BACKGROUND OF THE INVENTION

1. Field of the Invention

The present invention relates to a zoom lens suitable for a TV camera, video camera, and the like.

2. Related Background Art

As an autofocus (AF) system in a video camera or the like, a system called "hill-climbing AF" which obtains the distance to a principal object and drives a focus unit to an appropriate position is widely used.

In this system, the direction of the best imaging position is detected from a change in a video signal by using some of the lens units of an image pickup system for imaging, and the extension direction of a focusing lens is calculated. A merit of this system is that no optical system need be newly used for distance measurement.

In addition, in this system, in order to check whether the best imaging position is located before or after the image pickup surface (CCD surface or film surface), a partial optical system of the image pickup system is slightly amplitude-driven (to be referred to as wobbled hereinafter) in the optical axis direction. A focus unit is driven to set the best focus on the image pickup surface on the basis of the detected signal.

At this time, since part of the optical system is wobbled, the imaging magnification greatly changes to result in poor screen display unless lens units and the like are properly arranged.

As a method of reducing a change in imaging magnification, the method disclosed in Japanese Patent No. 2744336 is available. This method is associated with a rear focus zoom lens which has the first unit having a positive refractive power, the second unit having a negative refractive power for magnification changing operation, the third unit having a positive refractive power, and the fourth unit having a positive refractive power and serving to correct an image plane fluctuation with a change in magnification, and is designed to perform focusing by using the fourth unit.

A change in imaging magnification accompanying wobbling can be expressed by a paraxial trace. Several conditions for suppressing a change in imaging magnification accompanying wobbling small are described in U.S. Pat. No. 5,138,492.

These conditions are, however, insufficient to be applied to an image pickup system which has a wobbling lens unit placed in a relay lens unit located closer to the image side than the stop and allows insertion/removal of an extender for shifting the focal length to the telephoto side.

More specifically, the conditions described in the above reference are effective for a method of reducing a change in imaging magnification in a state where an optical arrangement behind the stop is fixed, but are not sufficient to be applied to a case wherein the arrangement of an optical system is changed upon insertion/removal of an extender or the like and the incident angle of an off-axis principal ray on a wobbling lens unit, in particular, changes.

SUMMARY OF THE INVENTION

It is an object of the present invention to provide a 4-unit zoom lens which exhibits a small change in imaging magnification accompanying wobbling even with insertion of an optical system such as an extender in the fourth unit serving as a relay lens unit and also exhibits excellent optical performance throughout the entire magnification change range.

In order to achieve the above object, according to the present invention, in a zoom lens in/from which a magnification changing optical unit for changing an overall focal length of the zoom lens can be inserted/removed, a wobbling unit which can be slightly amplitude-driven in an optical axis direction to detect a best imaging position is placed closer to an image side than an insertion position of the magnification changing optical unit.

With this arrangement, a change in imaging magnification caused when the wobbling unit is slightly driven in the optical axis direction can be reduced regardless of insertion/removal of the magnification changing optical unit.

The zoom lens sequentially includes, from an object side, a first unit which is fixed in magnification changing operation and has a positive refractive power, a second unit which moves in the optical axis direction in magnification changing operation and has a negative refractive power, a third unit for correcting an image plane fluctuation accompanying magnification changing operation, and a fourth unit having a positive refractive power for imaging, and a magnification changing optical unit which changes the overall focal length of the zoom lens can be inserted/removed in/from the fourth unit. In this zoom lens, a wobbling unit which can be slightly amplitude-driven in the optical axis direction to detect a best imaging position is placed closer to the image side than the insertion position of the magnification changing optical unit, and a stop for adjustment of light amount is preferably disposed at the object side with respect to the fourth unit.

More specifically, for example, when the wobbling unit is placed in the fourth unit and amplitude-driven to make an amplitude halfwidth of a backfocus change amount become ½ a depth of focus, $$|\alpha 1(S1-E1)/fw1|<0.6 \quad (1)$$

is satisfied, where $\alpha 1$ is an angle of an off-axis sub-principal ray incident on an object-side principal plane of the wobbling unit (without insertion of the magnification changing optical unit), S1 is a distance to a stop viewed from the object-side principal plane of the wobbling unit (without insertion of the magnification changing optical unit), E1 is a distance to an image pickup plane viewed from an image-side principal plane of the wobbling unit (without insertion of the magnification changing optical unit), and fw1 is a focal length at a wide-angle end without insertion of the magnification changing optical unit.

With this arrangement, a change in imaging magnification accompanying wobbling without insertion of the magnification changing optical unit can be suppressed sufficiently small.

In addition, when the wobbling unit is placed in the fourth unit amplitude-driven to make an amplitude halfwidth of a backfocus change amount become ½ a depth of focus, $$|\alpha 2(S2-E2)/fw2|<2.2 \quad (2)$$

is satisfied, where $\alpha 2$ is an angle of an off-axis sub-principal ray incident on the object-side principal plane of the wobbling unit (with insertion of the magnification changing optical unit), S2 is a distance to the stop viewed from the object-side principal plane of the wobbling unit (with insertion of the magnification changing optical unit), E2 is a distance to the image pickup plane viewed from the image-side principal plane of the wobbling unit (with insertion of the magnification changing optical unit), and fw2 is a focal length at the wide-angle end with insertion of the magnification changing optical unit.

In addition, in the fourth unit, $$-0.001 < \phi/Im < 0.0015 \quad (3)$$

is satisfied, where φ is a refractive power of a lens unit located immediately before the wobbling unit in the fourth unit, and Im is an image size of an image pickup element.

With this arrangement, a change in incident angle on the wobbling unit upon insertion/removal of the magnification changing optical unit can be made small. This makes it possible to reduce a change in imaging magnification more reliably.

Further, the amplitude halfwidth of the wobbling unit before/after insertion of the magnification changing optical system is preferably so set as to satisfy the following condition (4).

$$\Delta x_2 = F \cdot \Delta x_1 \quad (4)$$

where $\Delta x_1$ is an amplitude halfwidth of the wobbling unit before insertion of the magnification changing optical system, $\Delta x_2$ is an amplitude halfwidth of the wobbling unit after insertion of the magnification changing optical system, and F is a rate of change of F-number due to insertion/removal of the magnification changing optical system.

Note that a reduction in the size and weight of the wobbling unit to be slightly amplitude-driven may be attained by placing the wobbling unit closest to the image side in the fourth unit.

If this system is designed to retract part of the fourth unit from the optical axis by inserting the magnification changing optical unit, a large space for the insertion of the magnification changing optical unit can be ensured while a reduction in the overall size of the zoom lens is attained. This makes it possible to suppress a deterioration in optical performance at the time of insertion of the magnification changing optical unit.

BRIEF DESCRIPTION OF THE DRAWINGS

FIG. 9 is an aberration diagram at the wide-angle end in the first numerical embodiment;

FIG. 10 is an aberration diagram at the telephoto end in the first numerical embodiment;

FIG. 13 is an aberration diagram at the wide-angle end in the fourth numerical embodiment;

FIG. 14 is an aberration diagram at the telephoto end in the fourth numerical embodiment;

DETAILED DESCRIPTION OF THE PREFERRED EMBODIMENTS (First Embodiment)

FIGS. 1 to 6 show the cross-sectional configurations of lenses, of zoom lenses according to the first embodiment of the present invention, which are located at the wide-angle end and infinity focus position in the first to sixth numerical embodiments.

Referring to FIGS. 1 to 6, a first unit (front element) I has a positive refractive power, and a variator II serves as the second unit having a negative refractive power and capable of moving in the optical axis direction in magnification changing operation. The second unit II is monotonously moved to the image side on the optical axis to change the magnification from the wide-angle end to the telephoto end. In magnification changing operation, the second unit II is moved within a range including an imaging magnification of 1× (−1×) (i.e. equal magnification).

A compensator III serves as the third unit which can move in the optical axis direction to correct an image plane fluctuation accompanying magnification changing operation.

A stop SP is used for light amount adjustment. A fourth unit IV having a positive refractive power is used for imaging.

A glass block G is a color separation prism, optical filter, or the like. A wobbling unit wo can be slightly amplitude-driven in the optical axis direction to detect the best imaging position. A lens unit L4$b$ is placed immediately before the wobbling unit in the fourth unit.

An extender (magnification changing optical unit) EX for increasing or decreasing the overall focal length of the zoom lens system can be inserted/removed (or mounted/dismounted) in/from the space in the fourth unit.

In this embodiment, the configuration of a lens unit (to be referred to as a relay unit hereinafter) located closer to the image side than the stop SP is properly set such that a change in imaging magnification accompanying wobbling of the wobbling unit wo is reduced regardless of whether the extender EX is inserted/removed.

The wobbling unit wo needs to be amplitude-driven at high speed in the optical axis direction. It is therefore preferable that the wobbling unit wo have a proper backfocus sensitivity degree and be light in weight. A zoom lens for a TV set needs to have a long backfocus and a small F-number, and hence requires many lenses constituting each unit. In addition, each lens has a large effective diameter, and an extender, macro photographing mechanism, flange-back adjustment mechanism, and the like must be arranged in the relay unit, resulting in a low degree of freedom in placing the wobbling unit.

Figure 7:
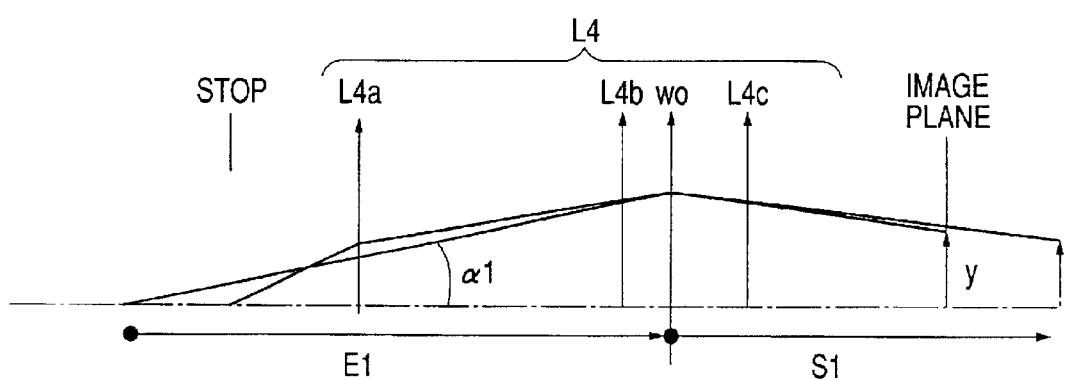
FIG. 7 is a schematic view showing an optical configuration after the stop of the zoom lens according to the first embodiment (without insertion of an extender)
Figure 8:
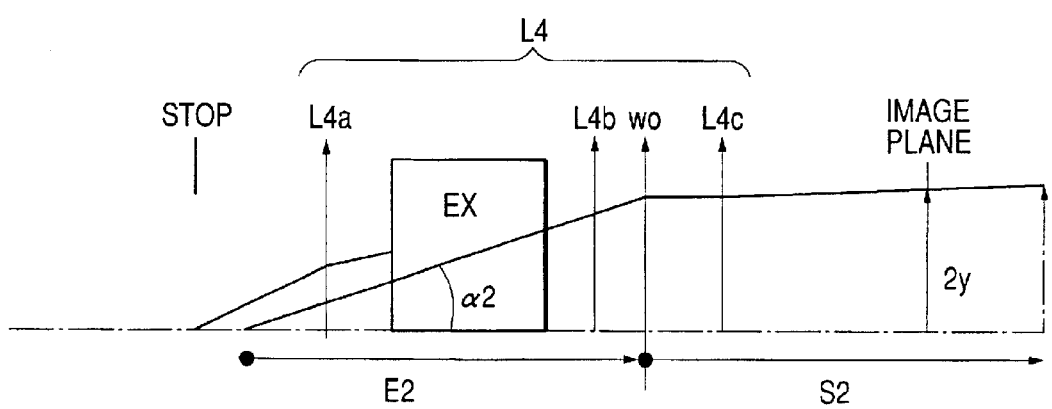
FIG. 8 is a schematic view showing an optical configuration after the stop of the zoom lens according to the first embodiment (with insertion of the extender)

FIGS. 7 and 8 schematically show lens units behind the stop SP. FIG. 7 shows a state where the extender EX is not inserted. FIG. 8 shows a state where the extender EX is inserted. Referring to FIG. 8, the magnification of the extender EX is set to 2×, and an image is enlarged by 2× on an image plane.

Referring to FIG. 7, an image height change ratio can be expressed as follows. Letting $\alpha 1$ be the incident angle of sub-principal ray on the wobbling unit wo, $\phi$wo be the power of the wobbling unit wo, S1 be the distance between the wobbling unit wo and an image plane, $\phi 4c$ be the power of lens unit L4$c$ located closer to the image side than the wobbling unit wo, $\Delta x$ be the wobbling amount, (S1−E1) be the difference between the distance to a virtual image of the stop SP viewed from the wobbling unit wo and the distance to a virtual image of the image plane viewed from the wobbling unit wo, and $\Delta y$ be the image height change amount at the time of wobbling, an image height change ratio $\Delta y/fw$ (where fw is the focal length of the overall system at the wide-angle end) can be expressed by $$\frac{\Delta y}{f_w} = \alpha_1 \cdot \phi_{wo} \cdot (S_1 \phi_{4c} - 1) \cdot \Delta x \cdot \{\Delta x - (S_1 - E_1)\} \cdot \frac{1}{f_w}$$

The wobbling amount $\Delta x$ is a sufficiently small value relative to (S1−E1), and hence can be expressed by $$\frac{\Delta y}{f_w} = \alpha_1 \cdot (S_1 \phi_{4c} - 1) \cdot (S_1 - E_1) \cdot \frac{1}{f_w}$$

In the configuration of the zoom lens according to this embodiment, parameters that change upon insertion/removal of the extender EX and have great influences on the image height change ratio $\Delta y/fw$ are the incident angle $\alpha 1$ of a principal ray on the wobbling unit wo and (S1−E1).

The allowable value of the wobbling amount $\Delta x$ will be described. It is said that the resolution of the visual sense of a person having 20/20 vision is about one minute. If, for example, the person watches a 30-inch TV screen (having a screen size of about 50 cm in the horizontal direction) at a distance of 2.5 m, the viewing angle in the horizontal direction becomes about 680 minutes. A resolution of one minute therefore corresponds to 0.15% of the screen.

If the lens is stopped down, the depth of focus increases as compared with that at full aperture. In addition, a larger wobbling amount is required to detect the best focus position, and hence the image height change ratio increases.

In consideration of the fact that the highest frequency in use of an F-number range is about full aperture: F/5.6, an image height change ratio is allowed at most 0.15% at F/5.6. An allowable value at full aperture (F/1.752) becomes about 0.06% which is about ⅓ the image height change ratio at F/5.6. The upper limit of conditional expression (1) is determined such that the image height change ratio at full aperture (F/1.752) falls within an image height change ratio of 0.06% (0.15% at F/5.6), and falls within the allowable range even if the image height change ratio changes upon insertion of the extender EX.

The relationship between the wobbling amount $\Delta x$ and the change amount in backfocus $\Delta sk$ is expressed by $$\Delta x = \frac{\Delta sk}{(1 - \beta_1^2) \cdot \beta_2^2}$$

where $\beta_1$ is a lateral magnification of the wobbling unit, and $\beta_2$ is a lateral magnification of an optical system placed at the image side with respect to the wobbling unit. When the change amount in backfocus $\Delta sk$ is ½ the depth of focus, the relationship between the change amount in backfocus $\Delta sk$ and the F-number fno is expressed by $$\Delta sk = \delta \cdot fno/2$$

where $\delta$ is a permissible circle of confusion determined by the camera system.

In the present invention, the wobbling lens unit is disposed closer to the image side than the magnification changing optical unit capable of being inserted and removed, so that the wobbling amount $\Delta x$ has a relation proportional to the F-number since both $\beta_1$ and $\beta_2$ are constant before/after insertion of the magnification changing optical system.

Considering the wobbling amount after insertion of a 2× extender, since the F-number becomes doubled, the depth of focus also becomes doubled. The amplitude driving amount of the wobbling unit must also be doubled.

The F-number in practical use at the time of insertion of the 2× extender falls within a narrow range of about F/4 to F/5.6 because the F-number at the full aperture end increases. For this reason, if a maximum of 0.15% of the value at F/5.6 is allowed at the time of insertion of the extender, the allowable amount at full aperture (F/4) becomes about 0.1%. That is, an allowable amount as large as double the value before the insertion of the extender can be allowed.

The allowable upper limit value of an image height change ratio indicated by conditional expressions (1) and (2) is the value set when the wobbling unit is amplitude-driven in the optical axis direction such that the amplitude halfwidth of a change in backfocus becomes ½ the depth of focus. In practice, this value changes depending on the manner of determining a wobbling amount with respect to the depth of focus (e.g., setting the amplitude halfwidth to ⅓ the depth of focus or to be equal to it), an assumed screen size, and the like.

Considering a system frequency using F-numbers equal to or larger than F/5.6 or setting of smaller full aperture F-numbers, a system is required in which the image height change ratio at full aperture is further suppressed and a change before/after insertion of an extender is smaller.

Consider only a state where no extender is inserted. In this case, to reduce a change in imaging magnification accompanying wobbling, the incident angle α1 of a sub-principal ray on the wobbling unit and the difference (S1−E1) between the distance E1 to the stop viewed from the wobbling unit and the distance S1 to the image plane viewed from the wobbling unit must be reduced.

When the extender EX in the state shown in FIG. 7 is inserted (FIG. 8), the incident angle of sub-principal ray on the wobbling unit wo changes to α2, and a distance E2 to the stop SP viewed from the wobbling unit wo changes. However, a distance S2 to the image plane viewed from the wobbling unit wo is almost constant (S2≈S1) regardless of insertion/removal of the extender, and hence a change in imaging magnification at the time of insertion of the extender remains.

In order to reduce a change in imaging magnification accompanying wobbling in a state where the extender is not inserted, the following condition must be satisfied:

$$0.05<|\alpha 1(S1-E1)/fw1|<0.6 \quad (1)$$

With approach to the lower limit value of conditional expression (1), a change in imaging magnification while the extender is not inserted is reduced, and an ideal condition is obtained.

While the extender is inserted, it is difficult to cancel out the distance E2 with respect to the distance S2 in FIG. 8, and a change in imaging magnification remains. This condition is not necessarily a desired condition for an optical system in/from which the extender is inserted/removed.

If the upper limit value is exceeded, a change in imaging magnification without insertion of the extender is large. It indicates that this condition is not suitable for wobbling.

Therefore, while the extender is inserted, the following is preferably satisfied:

$$0.05<|\alpha 2(S2-E2)/fw2|<2.2 \quad (2)$$

If the upper limit value of this conditional expression (2) is exceeded, it indicates that a change in imaging magnification at the time of insertion/removal of the extender is large.

In addition, the refractive power φ4b of the lens unit L4b located immediately before the wobbling unit wo in the fourth unit IV preferably satisfies $$-0.001<\phi 4b/Im<0.0015 \quad (3)$$

where Im is the image size of the image pickup element.

If the positive or negative refractive power of the lens unit L4b is increased beyond the range of conditional expression (3), the incident angle of a principal ray on the wobbling unit wo greatly changes from α1 to α2 or from α2 to α1, and a change in imaging magnification becomes large under one of the conditions.

It is preferable to set the amplitude amount of the wobbling unit to the following condition (4) before/after insertion of the magnification changing optical system.

$$\Delta x_2 = F \cdot \Delta x_1 \quad (4)$$

where $\Delta x_1$ is an amplitude halfwidth of the wobbling unit before insertion of the magnification changing optical system, $\Delta x_2$ is an amplitude halfwidth of the wobbling unit after insertion of the magnification changing optical system, and F is a rate of change of F-number due to insertion/removal of the magnification changing optical system. This enables the best focus position to be detected and a system in which blur is not conspicuous on a screen upon detection to be provided irrespective of whether the magnification changing optical system is inserted or not.

<<Numerical Embodiments>>

The numerical embodiments of this embodiment will be described below. In the numerical embodiments 5 to 6, let ri be the radius of curvature of the ith lens from the object side, di be the thickness or air gap of the ith optical member from the object side, and ni and γi ("vi" in the tables) be the refractive index and Abbe number, respectively, of the glass of the ith lens from the object side with respect to a d line.

Letting the X-axis be the optical axis direction, the H-axis be a direction perpendicular to the optical axis, a traveling direction of light be positive, R be the paraxial radius of curvature, and B, C, D, and E be aspherical coefficients, an aspherical shape is expressed by $$X = \frac{(1/R)H^2}{1+\sqrt{1-(H/R)^2}} + BH^4 + CH^6 + DH^8 + EH^{10}$$

(Numerical Embodiment 1)

TABLE 1

Numerical Embodiment 1
f = 9.50~185.25 Fno: 1.85~2.85 2ω: 60.1°~3.4°

| r1 = | 600.261 | d1 = | 2.20 | n1 = | 1.76168 | v1 = | 27.5 |
|------|---------|------|------|------|---------|------|------|
| r2 = | 81.461 | d2 = | 11.42 | n2 = | 1.49845 | v2 = | 81.6 |
| r3 = | −290.956 | d3 = | 7.63 | | | | |

TABLE 1-continued

Numerical Embodiment 1
f = 9.50~185.25 Fno: 1.85~2.85 2ω: 60.1°~3.4°

| | | | | | | | |
|---|---|---|---|---|---|---|---|
| r4 = | 86.701 | d4 = | 7.86 | n3 = | 1.62267 | v3 = | 60.3 |
| r5 = | 3044.710 | d5 = | 0.15 | | | | |
| r6 = | 66.016 | d6 = | 6.01 | n4 = | 1.73234 | v4 = | 54.7 |
| r7 = | 145.708 | d7 = | Variable | | | | |
| r8 = | 111.445 | d8 = | 0.80 | n5 = | 1.88814 | v5 = | 40.8 |
| r9 = | 16.812 | d9 = | 4.65 | | | | |
| r10 = | −47.842 | d10 = | 0.70 | n6 = | 1.82017 | v6 = | 46.6 |
| r11 = | 33.779 | d11 = | 2.24 | | | | |
| r12 = | 28.944 | d12 = | 5.20 | n7 = | 1.81264 | v7 = | 25.4 |
| r13 = | −29.192 | d13 = | 0.54 | | | | |
| r14 = | −24.664 | d14 = | 0.70 | n8 = | 1.79196 | v8 = | 47.4 |
| r15 = | 132.572 | d15 = | Variable | | | | |
| r16 = | −28.806 | d16 = | 0.75 | n9 = | 1.74679 | v9 = | 49.3 |
| r17 = | 37.218 | d17 = | 3.81 | n10 = | 1.85501 | v10 = | 23.9 |
| r18 = | 449.023 | d18 = | Variable | | | | |
| r19 = | ∞ (stop) | d19 = | 1.80 | | | | |
| r20 = | −231.233 | d20 = | 3.33 | n11 = | 1.67340 | v11 = | 47.2 |
| r21 = | −49.133 | d21 = | 0.20 | | | | |
| r22 = | −170.365 | d22 = | 4.05 | n12 = | 1.51976 | v12 = | 52.4 |
| r23 = | −38.625 | d23 = | 0.20 | | | | |
| r24 = | 36.315 | d24 = | 10.16 | n13 = | 1.48915 | v13 = | 70.2 |
| r25 = | −35.564 | d25 = | 1.66 | n14 = | 1.83932 | v14 = | 37.2 |
| r26 = | 0.000 | d26 = | 36.00 | | | | |
| r27 = | 97.385 | d27 = | 6.35 | n15 = | 1.50349 | v15 = | 56.4 |
| r28 = | −44.438 | d28 = | 0.20 | | | | |
| r29 = | −535.654 | d29 = | 1.40 | n16 = | 1.83932 | v16 = | 37.2 |
| r30 = | 21.016 | d30 = | 7.22 | n17 = | 1.50349 | v17 = | 56.4 |
| r31 = | −424.093 | d31 = | 1.50 | | | | |
| r32 = | 36.505 | d32 = | 8.29 | n18 = | 1.52033 | v18 = | 58.9 |
| r33 = | −27.482 | d33 = | 1.40 | n19 = | 1.77621 | v19 = | 49.6 |
| r34 = | 91.360 | d34 = | 0.30 | | | | |
| r35 = | 38.429 | d35 = | 6.84 | n20 = | 1.53430 | v20 = | 48.8 |
| r36 = | −52.407 | d36 = | 5.00 | | | | |
| r37 = | ∞ | d37 = | 30.00 | n21 = | 1.60718 | v21 = | 38.0 |
| r38 = | ∞ | d38 = | 16.20 | n22 = | 1.51825 | v22 = | 64.2 |
| r39 = | ∞ | | | | | | |

TABLE 2

Extender portion

| | | | | | | |
|---|---|---|---|---|---|---|
| | | d26 = | 1.60 | | | |
| r27 = | 64.675 | d27 = | 6.74 | n15 = 1.49845 | v15 = 81.5 | |
| r28 = | −54.795 | d28 = | 0.20 | | | |
| r29 = | 25.068 | d29 = | 6.49 | n16 = 1.49845 | v16 = 81.5 | |
| r30 = | −128.700 | d30 = | 0.80 | n17 = 1.85501 | v17 = 23.9 | |
| r31 = | 56.237 | d31 = | 11.25 | | | |
| r32 = | −106.936 | d32 = | 0.90 | n18 = 1.64254 | v18 = 60.1 | |
| r33 = | 10.653 | d33 = | 2.65 | n19 = 1.85501 | v19 = 23.9 | |
| r34 = | 14.647 | d34 = | 5.37 | | | |

| Variable Interval | Focal Length | | |
|---|---|---|---|
| | 9.50 | 38.00 | 185.25 |
| d 7 | 0.65 | 35.60 | 52.03 |
| d 15 | 53.75 | 13.79 | 6.32 |
| d 18 | 5.10 | 10.11 | 1.15 |

Figure 1:
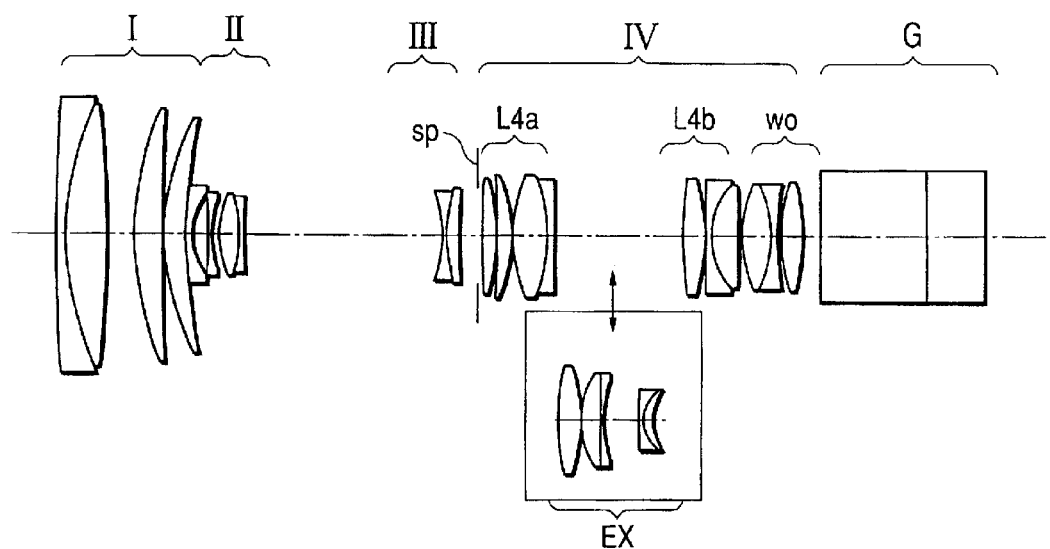
FIG. 1 is a sectional view of a zoom lens according to the first embodiment of the present invention at the wide-angle end in the first numerical embodiment.

In the numerical embodiment 1 shown in FIG. 1, to reduce variations in optical performance upon insertion of the extender EX, the extender EX is preferably placed in a substantially afocal parallel light beam. In addition, a wide gap is required to satisfy the extender magnification requirement and optical performance requirement.

As a wobbling unit which satisfies conditional expression (1), has a proper backfocus sensitivity degree accompanying slight amplitude driving of the wobbling unit wo, and exhibits a small change in imaging magnification, all or some of lens units located closer to the image side than the extender EX are preferably used.

In the numerical embodiment 1, three lenses of which form two units in the fourth unit and are located closest to the image side, are used as wobbling unit lenses. By making some lenses of the fourth unit movable, a reduction in the weight of the wobbling unit wo is achieved. In addition, by setting the refractive power of the lens unit L4b located immediately before the wobbling unit within the range of conditional expression (3), a change in imaging magnification is small regardless of the presence/absence of the extender EX.

In the numerical embodiment 1, the extender EX can be inserted/removed in/from a space with gap d26=36 mm.

Table 12 shows the numerical values of conditional expressions and imaging magnification change ratios in the respective numerical embodiments. Each imaging magnification change ratio is the value obtained when wobbling is performed upon setting the amplitude halfwidth to ½ the depth of focus at the full aperture end.

If, for example, the permissible circle of confusion of a ⅔-inch CCD (image size: φ11 mm) which is the mainstream in TV cameras is set to about 0.021 mm, the depth of focus at F/2 becomes about 0.04 mm.

Figure 19:
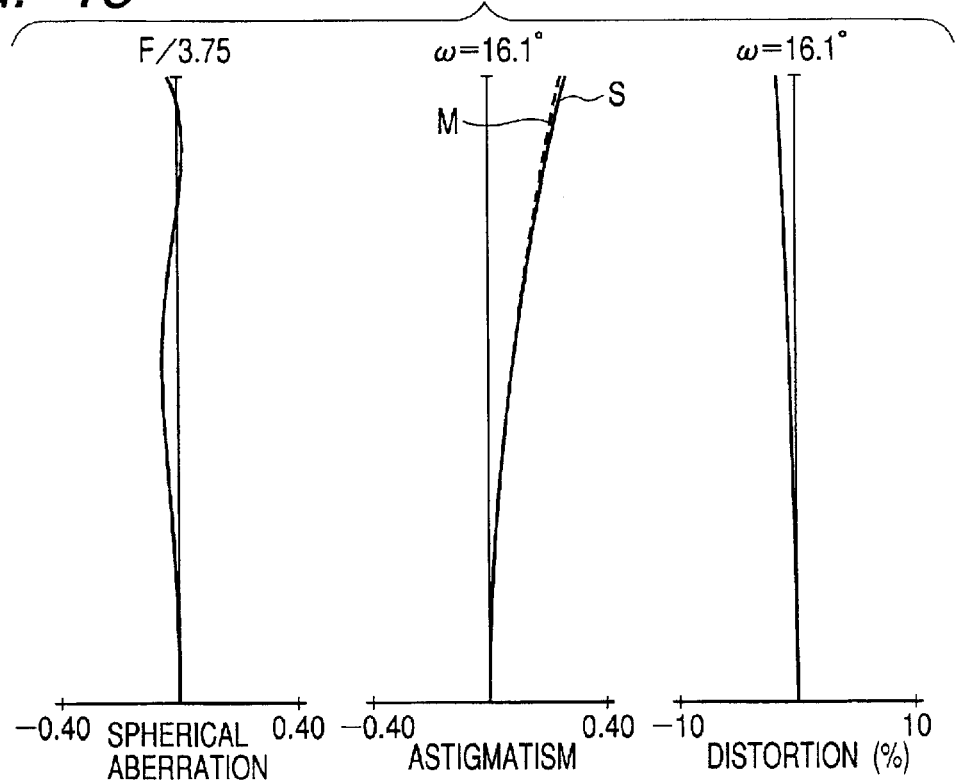
FIG. 19 is an aberration diagram at the wide-angle end in the first numerical embodiment at the time of insertion of the extender.

FIGS. 9 and 10 are aberration diagrams at the wide-angle end and telephoto end without insertion of the extender in the first numerical embodiment. FIG. 19 is an aberration diagram at the wide-angle end with insertion of the extender.

(Numerical Embodiment 2)

TABLE 3

Numerical Embodiment 2
f = 9.50~185.25 Fno: 2.0~2.85 2ω:60.1°~3.4°

| | | | | | | | | |
|---|---|---|---|---|---|---|---|---|
| r1 = | 622.723 | d1 = | 2.20 | n1 = | 1.76168 | v1 = | 27.5 |
| r2 = | 77.855 | d2 = | 12.34 | n2 = | 1.48915 | v2 = | 70.2 |
| r3 = | −323.998 | d3 = | 7.78 | | | | |
| r4 = | 86.923 | d4 = | 8.56 | n3 = | 1.62032 | v3 = | 63.4 |
| r5 = | −1529.464 | d5 = | 0.15 | | | | |
| r6 = | 64.688 | d6 = | 6.06 | n4 = | 1.73234 | v4 = | 54.7 |
| r7 = | 134.784 | d7 = | Variable | | | | |
| r8 = | 111.445 | d8 = | 0.80 | n5 = | 1.88814 | v5 = | 40.8 |
| r9 = | 16.812 | d9 = | 4.65 | | | | |
| r10 = | −47.842 | d10 = | 0.70 | n6 = | 1.82017 | v6 = | 46.6 |
| r11 = | 33.779 | d11 = | 2.24 | | | | |
| r12 = | 28.944 | d12 = | 5.20 | n7 = | 1.81264 | v7 = | 25.4 |
| r13 = | −29.192 | d13 = | 0.54 | | | | |
| r14 = | 24.664 | d14 = | 0.70 | n8 = | 1.79196 | v6 = | 47.4 |
| r15 = | 132.572 | d15 = | Variable | | | | |
| r16 = | −28.806 | d16 = | 0.75 | n9 = | 1.74679 | v9 = | 49.3 |
| r17 = | 37.218 | d17 = | 3.81 | n10 = | 1.85501 | v10 = | 23.9 |
| r18 = | 449.023 | d18 = | Variable | | | | |
| r19 = | ∞ (Stop) | d19 = | 1.40 | | | | |
| r20 = | −1109.872 | d20 = | 4.46 | n11 = | 1.67340 | v11 = | 47.2 |
| r21 = | −30.372 | d21 = | 0.20 | | | | |
| r22 = | 104.731 | d22 = | 6.31 | n12 = | 1.48915 | v12 = | 70.2 |
| r23 = | −26.574 | d23 = | 1.20 | n13 = | 1.83932 | v13 = | 37.2 |
| r24 = | −74.569 | d24 = | 30.00 | | | | |
| r25 = | 170.165 | d25 = | 3.69 | n14 = | 1.48915 | v14 = | 70.2 |
| r26 = | −86.018 | d26 = | 2.50 | | | | |
| r27 = | 46.559 | d27 = | 4.04 | n15 = | 1.69979 | v15 = | 55.5 |
| r28 = | 178.870 | d28 = | 5.00 | | | | |
| r29 = | −66.299 | d29 = | 1.20 | n16 = | 1.88815 | v16 = | 40.8 |
| r30 = | 151.817 | d30 = | 7.03 | n17 = | 1.48915 | v17 = | 70.2 |
| r31 = | −37.731 | d31 = | 0.15 | | | | |
| r32 = | 74.679 | d32 = | 1.20 | n18 = | 1.80642 | v18 = | 35.0 |
| r33 = | 28.773 | d33 = | 4.28 | | | | |
| r34 = | 78.908 | d34 = | 8.64 | n19 = | 1.52033 | v19 = | 58.9 |
| r35 = | −20.059 | d35 = | 1.20 | n20 = | 1.88615 | v20 = | 40.8 |
| r36 = | −66.519 | d36 = | 4.03 | | | | |
| r37 = | 1248.781 | d37 = | 4.71 | n21 = | 1.66152 | v21 = | 50.9 |
| r38 = | −35.175 | d38 = | 4.00 | | | | |
| r39 = | ∞ | d39 = | 30.00 | n22 = | 1.60718 | v22 = | 38.0 |
| r40 = | ∞ | d40 = | 16.20 | n23 = | 1.51825 | v23 = | 64.2 |
| r41 = | ∞ | | | | | | |

TABLE 4

Extender Portion

| | | | | | | |
|---|---|---|---|---|---|---|
| | | d24 = 1.60 | | | | |
| r25 = | −377.553 | d25 = 2.81 | n14 = 1.52033 | v14 = 58.9 |
| r26 = | −49.636 | d26 = 0.20 | | |
| r27 = | 19.162 | d27 = 5.72 | n15 = 1.51976 | v15 = 52.4 |
| r28 = | 96.555 | d28 = 0.20 | | |
| r29 = | 15.020 | d29 = 5.62 | n16 = 1.51625 | v16 = 64.1 |
| r30 = | 137.066 | d30 = 0.60 | n17 = 1.85501 | v17 = 23.9 |
| r31 = | 10.484 | d31 = 6.63 | | |
| r32 = | 49.330 | d32 = 0.90 | n18 = 1.64254 | v18 = 60.1 |
| r33 = | 11.941 | d33 = 2.99 | n19 = 1.85501 | v19 = 23.9 |
| r34 = | 30.619 | d34 = 2.67 | | |

| Variable | Focal Length | | |
|---|---|---|---|
| Interval | 9.50 | 38.00 | 185.25 |
| d 7 | 1.08 | 36.03 | 52.46 |
| d 15 | 53.75 | 13.79 | 6.32 |
| d 18 | 5.10 | 10.11 | 1.15 |

Figure 2:
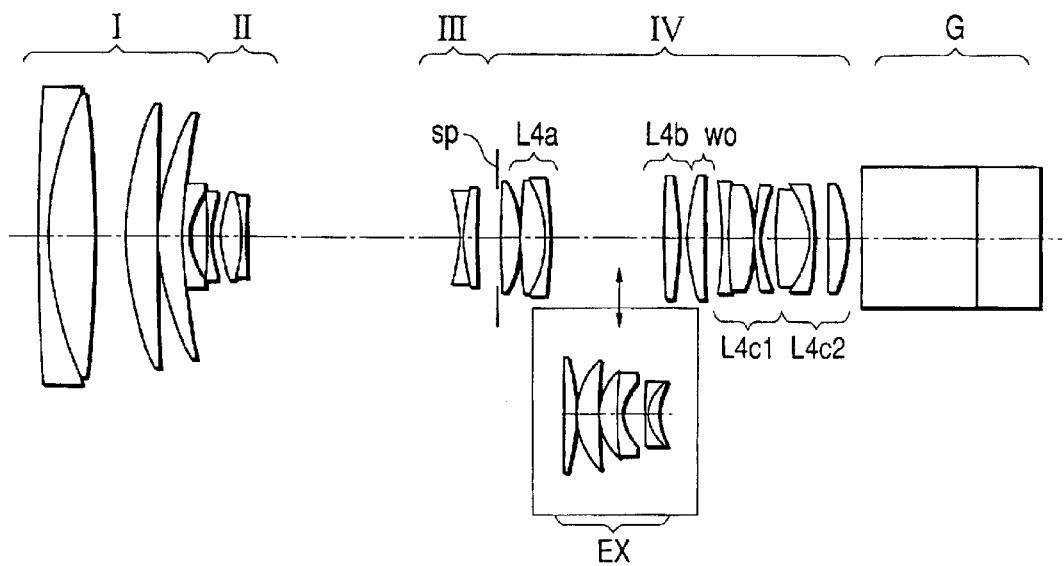
FIG. 2 is a sectional view of a zoom lens according to the first embodiment of the present invention at the wide-angle end in the second numerical embodiment.

In the numerical embodiment 2 shown in FIG. 2, the second lens located closer to the image side than the insertion gap of the extender EX is used as a wobbling lens. The extender EX can be inserted/removed in/from a space with d24=30 mm.

Since the positive refractive power φ4b of the lens unit L4b located immediately before the wobbling unit wo is brought near to the upper limit in the numerical embodiment 1, a change (conditional expression (2)) in imaging magnification upon insertion/removal of the extender takes a large value.

The lens unit L4c constituted by six lenses which form four units in the fourth unit and are located closer to the image side than the wobbling unit wo are constituted by two lens units L4c1 and L4c2. In addition, the use of the lens unit L4c2 allows macro photographing for proximity photographing and flange-back adjustment for adjusting the dimensional error between the reference surface of a lens (flange surface) and an image plane in a lens-interchangeable camera, independently of the main focusing lens.

Figure 11:
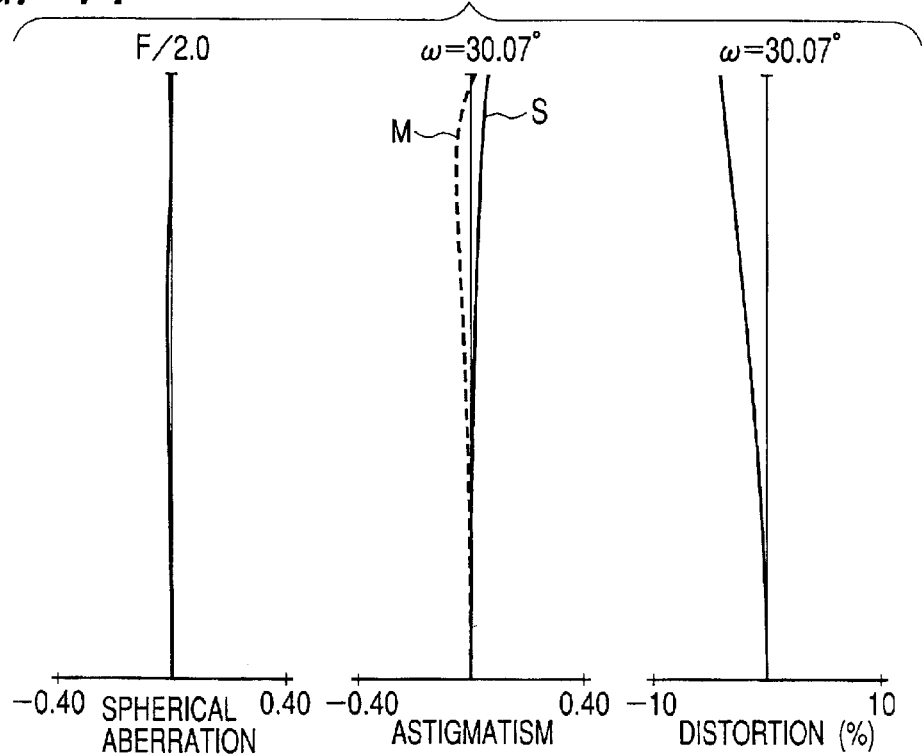
FIG. 11 is an aberration diagram at the wide-angle end in the second numerical embodiment.
Figure 12:
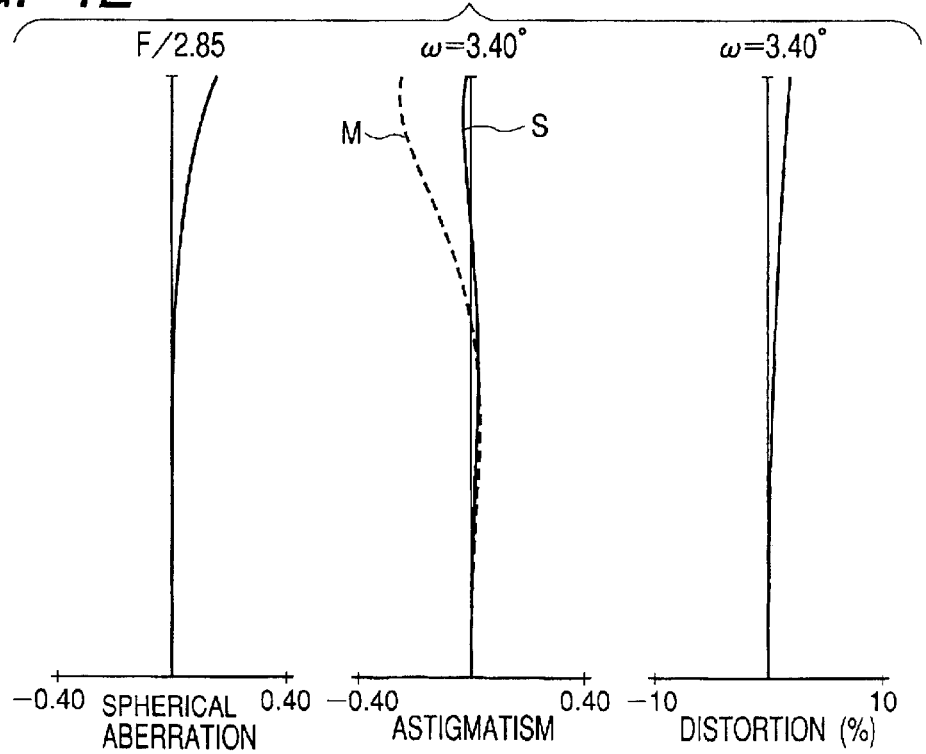
FIG. 12 is an aberration diagram at the telephoto end in the second numerical embodiment.
Figure 20:
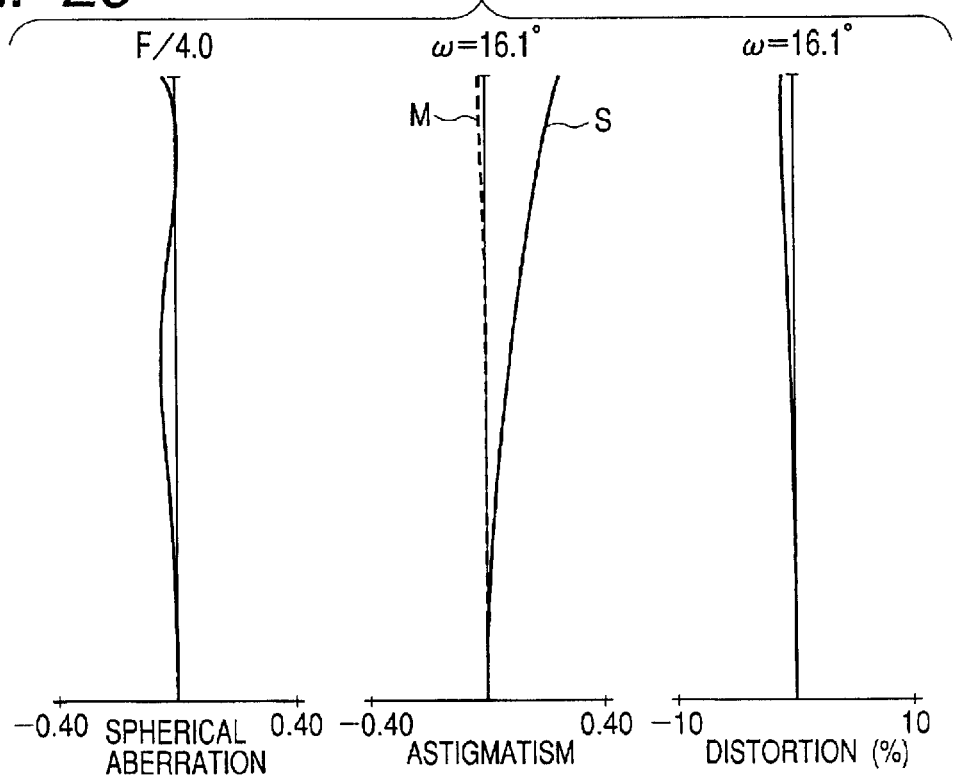
FIG. 20 is an aberration diagram at the wide-angle end in the second numerical embodiment at the time of insertion of the extender.

FIGS. 11 and 12 are aberration diagrams at the wide-angle end and telephoto end without insertion of the extender in the numerical embodiment 1. FIG. 20 is an aberration diagram at the wide-angle end with insertion of the extender.

(Numerical Embodiment 3)

TABLE 5

Numerical Embodiment 3
Extender Portion

|  |  |  |  |  |
|---|---|---|---|---|
|  |  | d24 = 1.60 |  |  |
| r25 = | 722.998 | d25 = 3.37 | n14 = 1.52033 | v14 = 58.9 |
| r26 = | −69.098 | d26 = 0.20 |  |  |
| r27 = | 21.904 | d27 = 5.85 | n15 = 1.51976 | v15 = 52.4 |
| r28 = | 156.587 | d28 = 0.20 |  |  |
| r29 = | 17.349 | d29 = 5.19 | n16 = 1.51825 | v16 = 64.1 |
| r30 = | 117.012 | d30 = 0.80 | n17 = 1.85501 | v17 = 23.9 |
| r31 = | 12.697 | d31 = 8.57 |  |  |
| r32 = | 378.277 | d32 = 0.90 | n18 = 1.64254 | v18 = 60.1 |
| r33 = | 12.453 | d33 = 3.52 | n19 = 1.85501 | v19 = 23.9 |
| r34 = | 25.927 | d34 = 6.00 |  |  |

Figure 3:
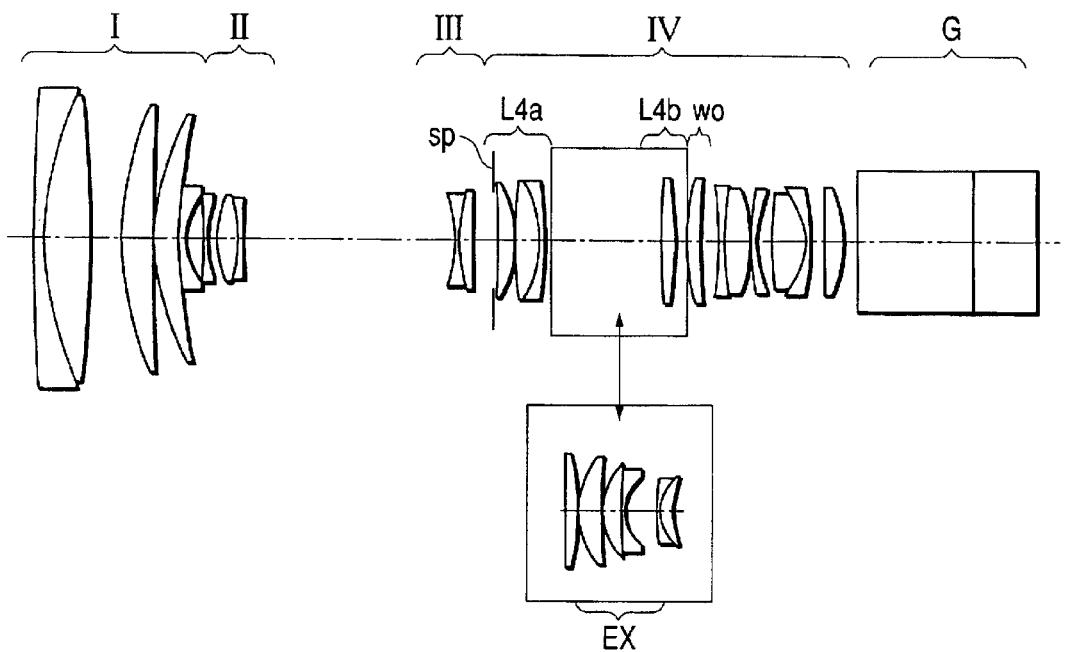
FIG. 3 is a sectional view of a zoom lens according to the first embodiment of the present invention at the wide-angle end in the third numerical embodiment.

In contrast to the lens system in the numerical embodiment 2, in the numerical embodiment 3 shown in FIG. 3, the extender can be inserted in the space with d24 to d26 by retracting (ejecting) part (L4b) of the fourth unit from the optical axis at the time of insertion of the extender EX. By retracting part of the fourth unit, a reduction in the space for insertion/removal of the extender can be attained. This makes it possible to achieve a reduction in the size of the lens system and suppress a deterioration in optical performance at the time of insertion of the extender by effectively using the wide space.

Even in a case where part of the fourth unit is retracted at the time of insertion of the extender, an appropriate imaging magnification change ratio can be kept by properly setting the refractive power of the lens unit L4b.

Figure 21:
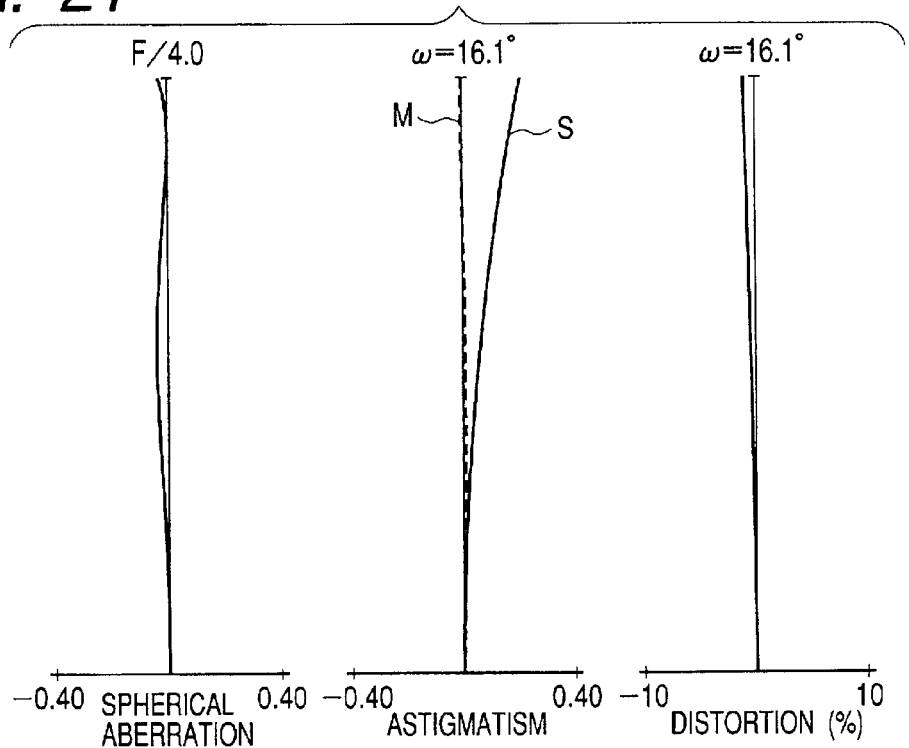
FIG. 21 is an aberration diagram at the wide-angle end in the third numerical embodiment at the time of insertion of the extender.

FIG. 21 is an aberration diagram at the wide-angle end at the time of insertion of the extender in the numerical embodiment 3.

(Numerical Embodiment 4)

TABLE 6

Numerical Embodiment 4
f = 9.50~185.25 Fno: 2.0~2.85 2ω: 60.1°~3.4°

|  |  |  |  |  |  |  |  |
|---|---|---|---|---|---|---|---|
| r1 = | 622.723 | d1 = | 2.20 | n1 = | 1.76168 | v1 = | 27.5 |
| r2 = | 77.855 | d2 = | 12.34 | n2 = | 1.48915 | v2 = | 70.2 |
| r3 = | −323.998 | d3 = | 7.78 |  |  |  |  |
| r4 = | 86.923 | d4 = | 8.56 | n3 = | 1.62032 | v3 = | 63.4 |
| r5 = | −1529.464 | d5 = | 0.15 |  |  |  |  |
| r6 = | 64.688 | d6 = | 6.06 | n4 = | 1.73234 | v4 = | 54.7 |
| r7 = | 134.784 | d7 = | Variable |  |  |  |  |
| r8 = | 111.445 | d8 = | 0.80 | n5 = | 1.88814 | v5 = | 40.8 |
| r9 = | 16.812 | d9 = | 4.65 |  |  |  |  |
| r10 = | −47.842 | d10 = | 0.70 | n6 = | 1.82017 | v6 = | 46.6 |
| r11 = | 33.779 | d11 = | 2.24 |  |  |  |  |
| r12 = | 28.944 | d12 = | 5.20 | n7 = | 1.81264 | v7 = | 25.4 |
| r13 = | −29.192 | d13 = | 0.54 |  |  |  |  |
| r14 = | −24.664 | d14 = | 0.70 | n8 = | 1.79196 | v8 = | 47.4 |
| r15 = | 132.572 | d15 = | Variable |  |  |  |  |
| r16 = | −28.806 | d16 = | 0.75 | n9 = | 1.74679 | v9 = | 49.3 |
| r17 = | 37.218 | d17 = | 3.81 | n10 = | 1.85501 | v10 = | 23.9 |
| r18 = | 449.023 | d18 = | Variable |  |  |  |  |
| r19 = | ∞ (Stop) | d19 = | 1.40 |  |  |  |  |
| r20 = | −167.968 | d20 = | 4.19 | n11 = | 1.66152 | v11 = | 50.9 |
| r21 = | −28.839 | d21 = | 0.20 |  |  |  |  |
| r22 = | 216.499 | d22 = | 2.57 | n12 = | 1.48915 | v12 = | 70.2 |
| r23 = | −159.531 | d23 = | 0.00 |  |  |  |  |
| r24 = | 88.816 | d24 = | 6.34 | n13 = | 1.48915 | v13 = | 70.2 |
| r25 = | −29.606 | d25 = | 1.20 | n14 = | 1.83932 | v14 = | 37.2 |
| r26 = | −76.274 | d26 = | 30.00 |  |  |  |  |
| r27 = | −59.688 | d27 = | 1.20 | n15 = | 1.48915 | v15 = | 70.2 |
| r28 = | 35.023 | d28 = | 2.50 |  |  |  |  |
| r29 = | 43.898 | d29 = | 4.98 | n16 = | 1.69979 | v16 = | 55.5 |
| r30 = | −79.430 | d30 = | 2.50 |  |  |  |  |
| r31 = | −45.969 | d31 = | 1.20 | n17 = | 1.88815 | v17 = | 40.8 |
| r32 = | 72.323 | d32 = | 7.79 | n18 = | 1.48915 | v18 = | 70.2 |
| r33 = | −28.720 | d33 = | 0.15 |  |  |  |  |
| r34 = | 129.989 | d34 = | 1.20 | n19 = | 1.80642 | v19 = | 35.0 |
| r35 = | 29.797 | d35 = | 3.71 |  |  |  |  |
| r36 = | 66.757 | d36 = | 9.33 | n20 = | 1.51976 | v20 = | 52.4 |
| r37 = | −17.449 | d37 = | 1.20 | n21 = | 1.888185 | v21 = | 40.8 |
| r38 = | −49.582 | d38 = | 3.79 |  |  |  |  |
| r39 = | 819.738 | d39 = | 4.62 | n22 = | 1.66152 | v22 = | 50.9 |
| r40 = | −31.246 | d40 = | 4.00 |  |  |  |  |
| r41 = | ∞ | d41 = | 30.00 | n23 = | 1.60718 | v23 = | 38.0 |
| r42 = | ∞ | d42 = | 16.20 | n24 = | 1.51825 | v24 = | 64.2 |
| r43 = | ∞ |  |  |  |  |  |  |

TABLE 7

Extender Portion

|  |  | d26 = 1.60 |  |  |
|---|---|---|---|---|
| r27 = | 746.348 | d27 = 3.32 | n15 = 1.48915 | v15 = 70.2 |
| r28 = | −55.071 | d28 = 0.20 |  |  |
| r29 = | 16.521 | d29 = 5.27 | n16 = 1.49845 | v16 = 81.5 |
| r30 = | 36.028 | d30 = 0.20 |  |  |
| r31 = | 13.452 | d31 = 4.96 | n17 = 1.51825 | v17 = 64.1 |
| r32 = | 31.044 | d32 = 0.80 | n18 = 1.85501 | v18 = 23.9 |
| r33 = | 9.442 | d33 = 7.64 |  |  |
| r34 = | 37.409 | d34 = 0.90 | n19 = 1.75844 | v19 = 52.3 |
| r35 = | 11.531 | d35 = 3.17 | n20 = 1.85501 | v20 = 23.9 |
| r36 = | 45.968 | d36 = 1.97 |  |  |

| Variable Interval | Focal Length | | |
|---|---|---|---|
|  | 9.50 | 38.00 | 185.25 |
| d 7 | 1.08 | 36.03 | 52.46 |
| d 15 | 53.75 | 13.79 | 6.32 |
| d 18 | 5.10 | 10.11 | 1.15 |

Figure 4:
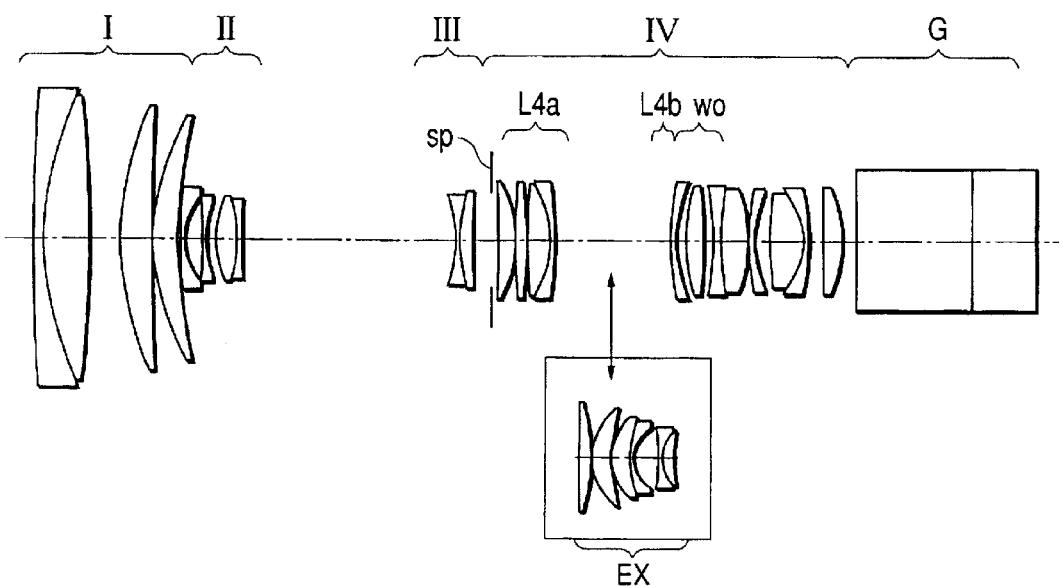
FIG. 4 is a sectional view of a zoom lens according to the first embodiment of the present invention at the wide-angle end in the fourth numerical embodiment.

In the numerical embodiment 4 shown in FIG. 4, the second lens located closer to the image side than the insertion gap for the extender EX is used as a wobbling unit lens. In addition, the extender EX can be inserted in a space with d26=30 mm.

In the numerical embodiment 4, the lens unit L4b located closer to the object side than the wobbling unit wo has a negative refractive power. In contrast to the numerical embodiment 1, since φ4b is brought closer to the lower limit, a change in imaging magnification (conditional expression (2)) accompanying insertion of the extender EX takes a large value.

Figure 22:
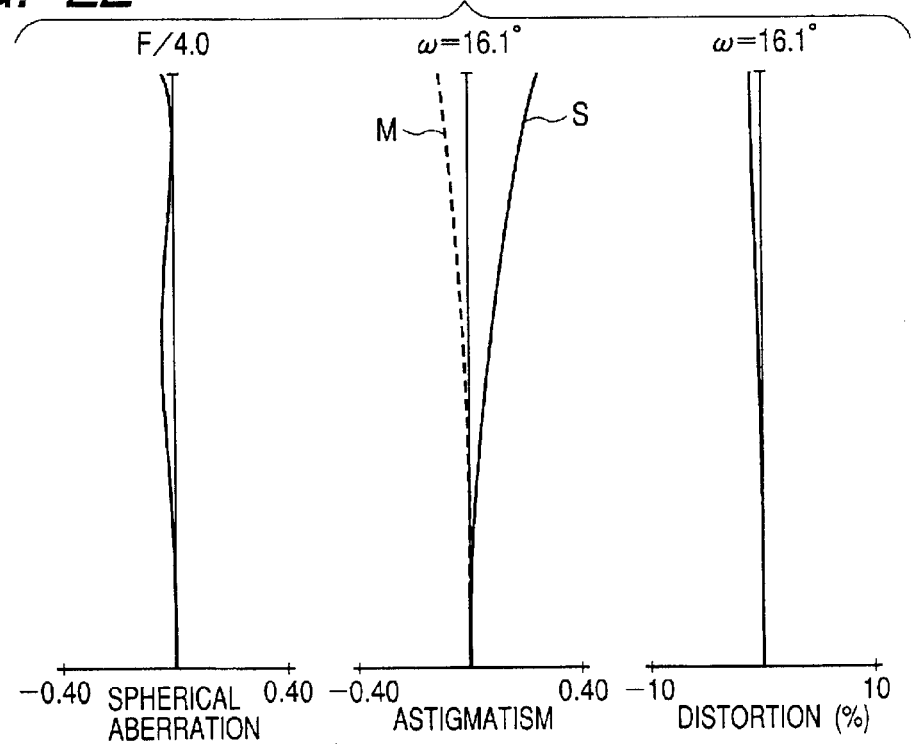
FIG. 22 is an aberration diagram at the wide-angle end in the fourth numerical embodiment at the time of insertion of the extender.

FIGS. 13 and 14 are aberration diagrams at the wide-angle end and telephoto end without insertion of the extender in the numerical embodiment 4. FIG. 22 is an aberration diagram at the wide-angle end with insertion of the extender.

(Numerical Embodiment 5)

TABLE 8

Numerical Embodiment 5
f = 9.50~185.25 Fno: 2.0~2.85 2ω: 60.1°~3.4°

| r1 = | 622.723 | d1 = | 2.20 | n1 = | 1.76168 | v1 = | 27.5 |
|---|---|---|---|---|---|---|---|
| r2 = | 77.855 | d2 = | 12.34 | n2 = | 1.48915 | v2 = | 70.2 |
| r3 = | −323.998 | d3 = | 7.78 |  |  |  |  |
| r4 = | 86.923 | d4 = | 8.56 | n3 = | 1.62032 | v3 = | 63.4 |
| r5 = | −1529.464 | d5 = | 0.15 |  |  |  |  |
| r6 = | 64.658 | d6 = | 6.06 | n4 = | 1.73234 | v4 = | 54.7 |
| r7 = | 134.784 | d7 = | Variable |  |  |  |  |
| r8 = | 111.445 | d8 = | 0.80 | n5 = | 1.88814 | v5 = | 40.8 |
| r9 = | 16.812 | d9 = | 4.65 |  |  |  |  |
| r10 = | −47.842 | d10 = | 0.70 | n6 = | 1.82017 | v6 = | 46.6 |
| r11 = | 33.779 | d11 = | 2.24 |  |  |  |  |
| r12 = | 28.944 | d12 = | 5.20 | n7 = | 1.81264 | v7 = | 25.4 |
| r13 = | −29.192 | d13 = | 0.54 |  |  |  |  |
| r14 = | −24.664 | d14 = | 0.70 | n8 = | 1.79196 | v8 = | 47.4 |
| r15 = | 132.572 | d15 = | Variable |  |  |  |  |
| r16 = | −28.806 | d16 = | 0.75 | n9 = | 1.74679 | v9 = | 49.3 |
| r17 = | 37.218 | d17 = | 3.81 | n10 = | 1.85501 | v10 = | 23.9 |
| r18 = | 449.023 | d18 = | Variable |  |  |  |  |
| r19 = | ∞ (Stop) | d19 = | 1.40 |  |  |  |  |
| r20 = | −285.753 | d20 = | 4.45 | n11 = | 1.66152 | v11 = | 50.9 |
| r21 = | −27.952 | d21 = | 0.20 |  |  |  |  |
| r22 = | 64.233 | d22 = | 7.14 | n12 = | 1.48915 | v12 = | 70.2 |
| r23 = | −25.959 | d23 = | 1.20 | n13 = | 1.83932 | v13 = | 37.2 |
| r24 = | −72.322 | d24 = | 30.00 |  |  |  |  |
| r25 = | 47.982 | d25 = | 5.34 | n14 = | 1.48915 | v14 = | 70.2 |
| r26 = | −125.570 | d26 = | 2.50 |  |  |  |  |
| r27 = | −96.426 | d27 = | 1.20 | n15 = | 1.69979 | v15 = | 55.5 |
| r28 = | 191.570 | d28 = | 5.00 |  |  |  |  |
| r29 = | −122.237 | d29 = | 1.20 | n16 = | 1.66815 | v16 = | 40.8 |
| r30 = | 1090.682 | d30 = | 5.32 | n17 = | 1.48915 | v17 = | 70.2 |
| r31 = | −30.494 | d31 = | 0.15 |  |  |  |  |
| r32 = | 106.004 | d32 = | 1.20 | n18 = | 1.80642 | v18 = | 35.0 |
| r33 = | 34.262 | d33 = | 2.67 |  |  |  |  |
| r34 = | 47.028 | d34 = | 8.44 | n19 = | 1.50349 | v19 = | 56.4 |
| r35 = | −20.185 | d35 = | 1.20 | n20 = | 1.88815 | v20 = | 40.8 |
| r36 = | −76.910 | d36 = | 2.56 |  |  |  |  |
| r37 = | 90.553 | d37 = | 4.83 | n21 = | 1.66152 | v21 = | 50.9 |
| r38 = | −49.369 | d38 = | 4.00 |  |  |  |  |
| r39 = | ∞ | d39 = | 30.00 | n22 = | 1.60718 | v22 = | 38.0 |
| r40 = | ∞ | d40 = | 16.20 | n23 = | 1.51825 | v23 = | 64.2 |
| r41 = | ∞ |  |  |  |  |  |  |

TABLE 9

Extender Portion

|  |  |  |  |  |
|---|---|---|---|---|
|  |  | d24 = 1.60 |  |  |
| r25 = | 1327.342 | d25 = 2.96 | n14 = 1.52033 | v14 = 56.9 |
| r26 = | −65.631 | d26 = 0.20 |  |  |
| r27 = | 19.393 | d27 = 5.95 | n15 = 1.52033 | v15 = 58.9 |
| r28 = | 92.908 | d28 = 0.20 |  |  |
| r29 = | 16.254 | d29 = 5.90 | n16 = 1.51825 | v16 = 64.1 |
| r30 = | 88.347 | d30 = 0.80 | n17 = 1.85501 | v17 = 23.9 |
| r31 = | 10.562 | d31 = 6.15 |  |  |
| r32 = | −61.482 | d32 = 0.90 | n18 = 1.64254 | v18 = 60.1 |
| r33 = | 11.288 | d33 = 2.81 | n19 = 1.85501 | v19 = 23.9 |
| r34 = | 24.985 | d34 = 2.54 |  |  |

| Variable Interval | Focal Length | | |
|---|---|---|---|
|  | 9.50 | 38.00 | 185.25 |
| d 7 | 1.08 | 36.03 | 52.46 |
| d 15 | 53.75 | 13.79 | 6.32 |
| d 18 | 5.10 | 10.11 | 1.15 |

Figure 5:
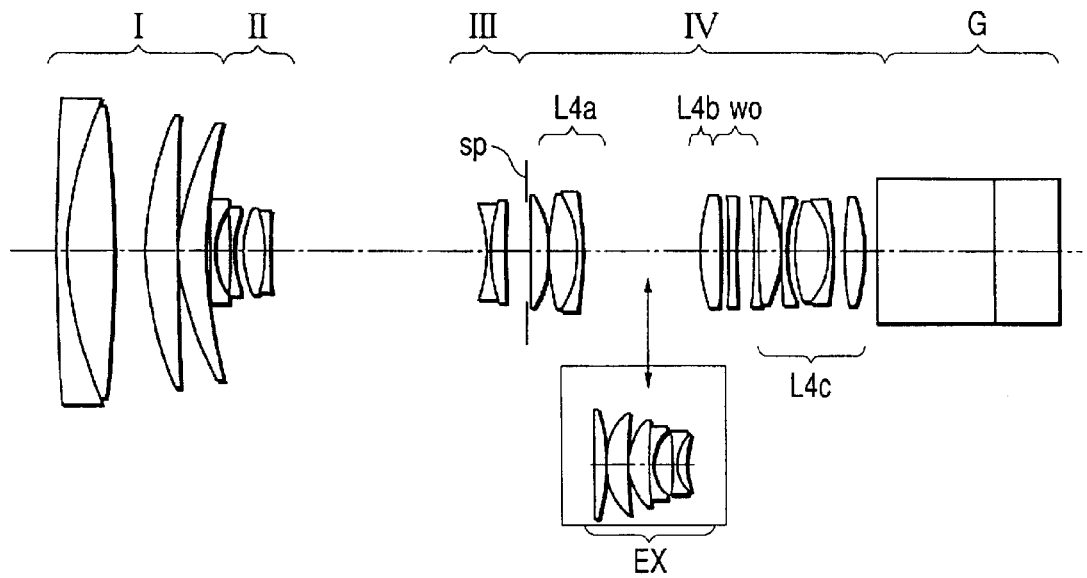
FIG. 5 is a sectional view of a zoom lens according to the first embodiment of the present invention at the wide-angle end in the fifth numerical embodiment.

In the numerical embodiment 5 shown in FIG. 5, the second lens located closer to the image side than the insertion gap for the extender EX is used as a wobbling unit lens, and the extender EX can be inserted/removed in/from a space with d24=30 mm. In the numerical embodiment 5, the wobbling unit wo has a negative refractive power.

In the numerical embodiment 5, φ4b is brought closer to the upper limit, a change in imaging magnification (conditional expression (2)) accompanying insertion/removal of the extender takes a large value.

In this numerical embodiment, the unit L4c is integrally moved to allow macro photographing and flange-back adjustment.

Figure 15:
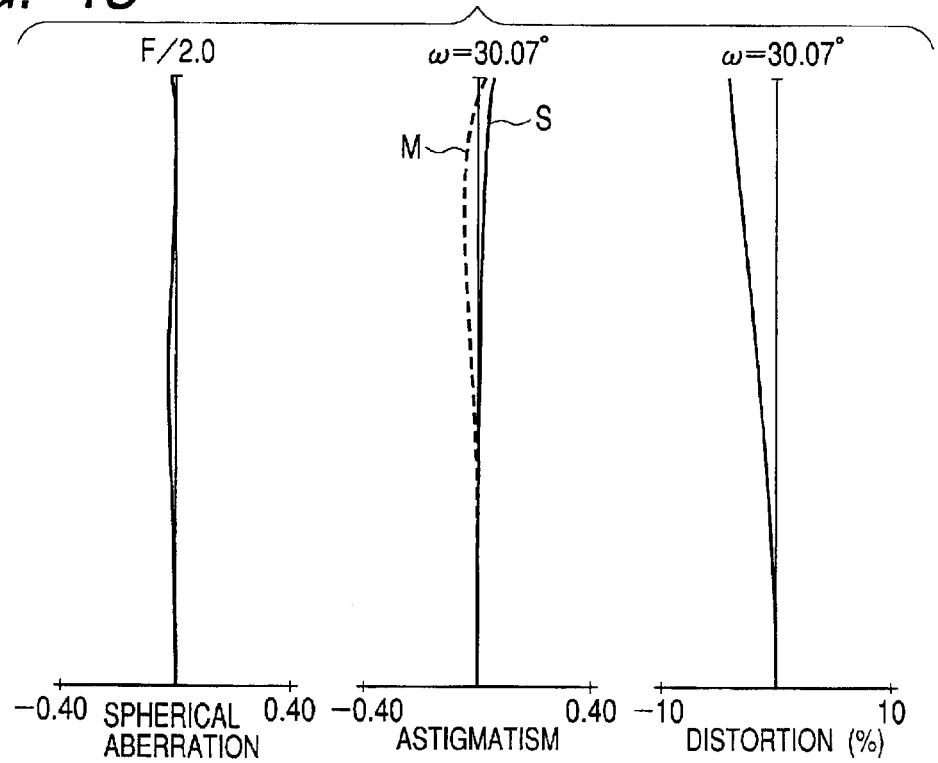
FIG. 15 is an aberration diagram at the wide-angle end in the fifth numerical embodiment.
Figure 16:
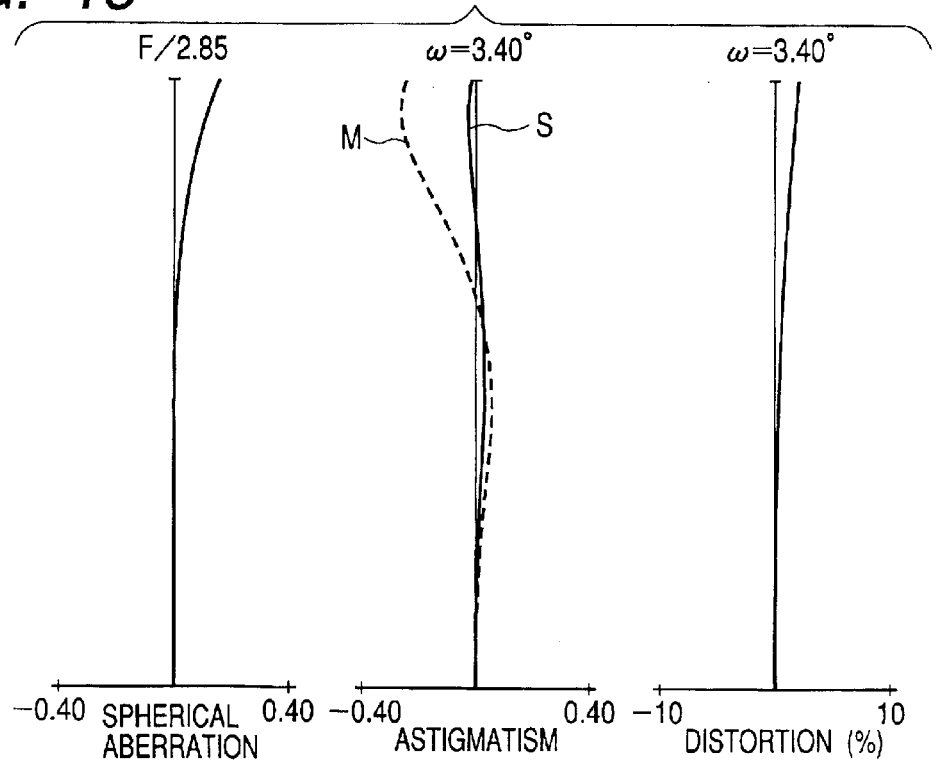
FIG. 16 is an aberration diagram at the telephoto end in the fifth numerical embodiment.
Figure 23:
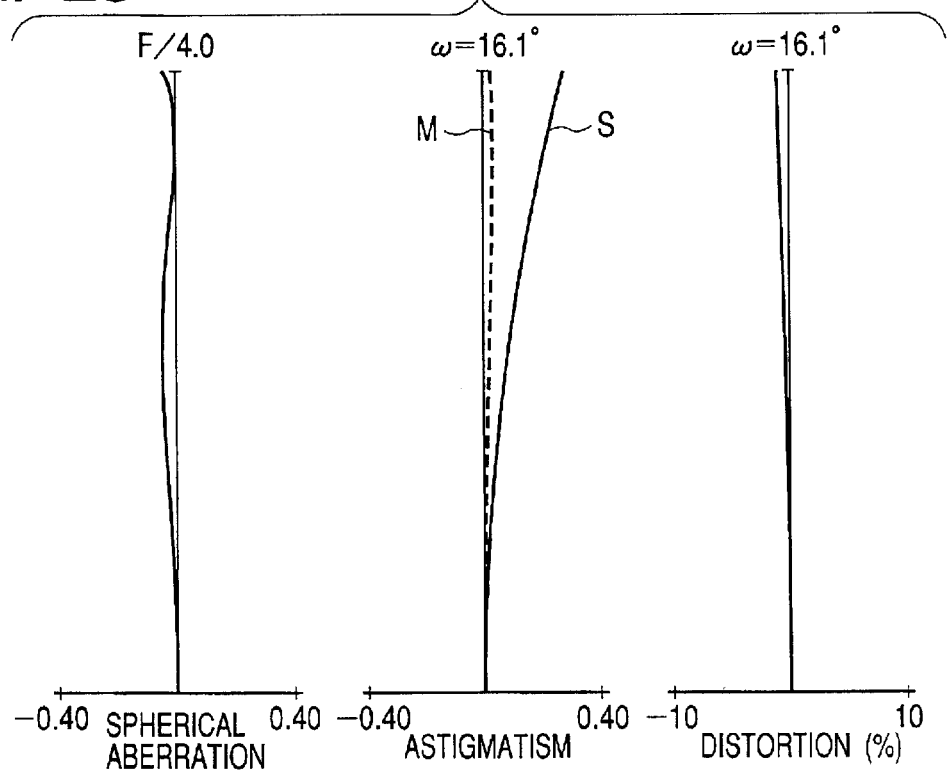
FIG. 23 is an aberration diagram at the wide-angle end in the fifth numerical embodiment at the time of insertion of the extender.

FIGS. 15 and 16 are aberration diagrams at the wide-angle end and telephoto end without insertion of the extender in the numerical embodiment 5. FIG. 23 is an aberration diagram at the wide-angle end with insertion of the extender.

(Numerical Embodiment 6)

TABLE 10

Numerical Embodiment 6
f = 10.0~440.0 Fno:1.75~3.0 2ω:57.6°~1.4°

| r1 = | 370.170 | d1 = | 5.50 | n 1 = | 1.72311 | v 1 = | 29.5 |
|---|---|---|---|---|---|---|---|
| r2 = | 179.081 | d2 = | 0.47 |  |  |  |  |
| r3 = | 177.086 | d3 = | 21.52 | n 2 = | 1.43496 | v 2 = | 95.1 |
| r4 = | −738.246 | d4 = | 0.30 |  |  |  |  |
| r5 = | 179.834 | d5 = | 16.94 | n 3 = | 1.43496 | v 3 = | 95.1 |
| r6 = | −18484.355 | d6 = | 0.30 |  |  |  |  |
| r7 = | 136.803 | d7 = | 11.61 | n 4 = | 1.49845 | v 4 = | 81.6 |
| r8 = | 299.938 | d8 = | Variable |  |  |  |  |
| r9 = | 2064.706 | d9 = | 2.00 | n 5 = | 1.82017 | v 5 = | 46.6 |
| r10 = | 56.194 | d10 = | 4.93 |  |  |  |  |
| r11 = | −200.836 | d11 = | 1.80 | n 6 = | 1.77621 | v 6 = | 49.6 |
| r12 = | 58.527 | d12 = | 5.92 |  |  |  |  |
| r13 = | −70.671 | d13 = | 1.80 | n 7 = | 1.82017 | v 7 = | 46.6 |
| r14 = | 47.059 | d14 = | 7.61 | n 8 = | 1.93306 | v 8 = | 21.3 |
| r15 = | −741.457 | d15 = | Variable |  |  |  |  |
| r16 = | −3286.891 | d16 = | 6.09 | n 9 = | 1.50014 | v 9 = | 65.0 |
| r17 = | −100.506 | d17 = | 0.30 |  |  |  |  |
| r18 = | 181.499 | d18 = | 2.50 | n10 = | 1.65223 | v10 = | 33.8 |
| r19 = | 80.299 | d19 = | 11.32 | n11 = | 1.59143 | v11 = | 61.2 |
| r20 = | −160.387 | d20 = | 0.20 |  |  |  |  |
| r21 = | 153.942 | d21 = | 11.39 | n12 = | 1.60548 | v12 = | 60.7 |
| r22 = | −78.774 | d22 = | 2.50 | n13 = | 1.85501 | v13 = | 23.9 |
| r23 = | −210.812 | d23 = | 0.20 |  |  |  |  |
| r24 = | 126.354 | d24 = | 7.22 | n14 = | 1.48915 | v14 = | 70.2 |
| r25 = | −511.899 | d25 = | Variable |  |  |  |  |
| r26 = | ∞ (Stop) | d26 = | 3.20 |  |  |  |  |
| r27 = | −61.995 | d27 = | 1.80 | n15 = | 1.79013 | v15 = | 44.2 |
| r28 = | 27.859 | d28 = | 5.10 | n16 = | 1.81266 | v16 = | 25.4 |
| r29 = | 95.165 | d29 = | 5.38 |  |  |  |  |
| r30 = | −36.960 | d30 = | 1.60 | n17 = | 1.73234 | v17 = | 54.7 |
| r31 = | 61.070 | d31 = | 13.54 | n18 = | 1.59911 | v18 = | 39.2 |
| r32 = | −42.108 | d32 = | 10.38 |  |  |  |  |
| r33 = | −161.981 | d33 = | 6.30 | n19 = | 1.77621 | v19 = | 49.6 |
| r34 = | −78.477 | d34 = | 8.00 |  |  |  |  |
| r35 = | 122.002 | d35 = | 6.76 | n20 = | 1.48915 | v20 = | 70.2 |
| r36 = | −60.053 | d36 = | 3.00 |  |  |  |  |
| r37 = | −251.658 | d37 = | 2.20 | n21 = | 1.83932 | v21 = | 37.2 |
| r38 = | 35.540 | d38 = | 6.45 | n22 = | 1.50349 | v22 = | 56.4 |
| r39 = | −139.587 | d39 = | 2.65 |  |  |  |  |
| r40 = | 638.436 | d40 = | 5.93 | n23 = | 1.55099 | v23 = | 45.8 |
| r41 = | −36.259 | d41 = | 2.20 | n24 = | 1.81265 | v24 = | 25.4 |
| r42 = | −97.233 | d42 = | 0.20 |  |  |  |  |
| r43 = | 101.200 | d43 = | 5.15 | n25 = | 1.51977 | v25 = | 52.4 |
| r44 = | −76.148 | d44 = | 5.00 |  |  |  |  |
| r45 = | ∞ | d45 = | 50.00 | n26 = | 1.51825 | v26 = | 64.2 |
| r46 = | ∞ |  |  |  |  |  |  |

Seventeenth Surface Aspherical Surface
R = −1.01 × 10$^{+2}$, B = 5.06 × 10$^{−8}$, C = 4.27 × 10$^{−12}$, D = 2.70 × 10$^{−14}$, E = −2.56 × 10$^{−17}$

TABLE 11

Extender Portion

|  |  |  |  |  |  |
|---|---|---|---|---|---|
|  | d29 = | 9.29 |  |  |  |
| r30 = | 51.233 | d30 = | 6.13 | n17 = 1.48915 | v17 = 70.2 |
| r31 = | −81.169 | d31 = | 6.03 |  |  |
| r32 = | 2003.963 | d32 = | 5.29 | n18 = 1.69979 | v18 = 55.5 |
| r33 = | −41.347 | d33 = | 1.20 | n19 = 1.85501 | v19 = 23.9 |
| r34 = | −86.830 | d34 = | 0.85 |  |  |
| r35 = | 49.570 | d35 = | 1.40 | n20 = 1.82017 | v20 = 46.6 |
| r36 = | 33.003 | d36 = | 4.09 |  |  |
| r37 = | −672.531 | d37 = | 0.90 | n21 = 1.82017 | v21 = 46.6 |
| r38 = | 17.840 | d38 = | 4.10 | n22 = 1.85501 | v22 = 23.9 |
| r39 = | 35.205 | d39 = | 5.92 |  |  |

| Variable | Focal Length | | |
|---|---|---|---|
| Interval | 10.00 | 65.04 | 440.00 |
| d 8 | 4.88 | 93.03 | 123.88 |
| d 15 | 178.94 | 72.57 | 2.98 |
| d 25 | 3.30 | 21.52 | 60.26 |

Figure 6:
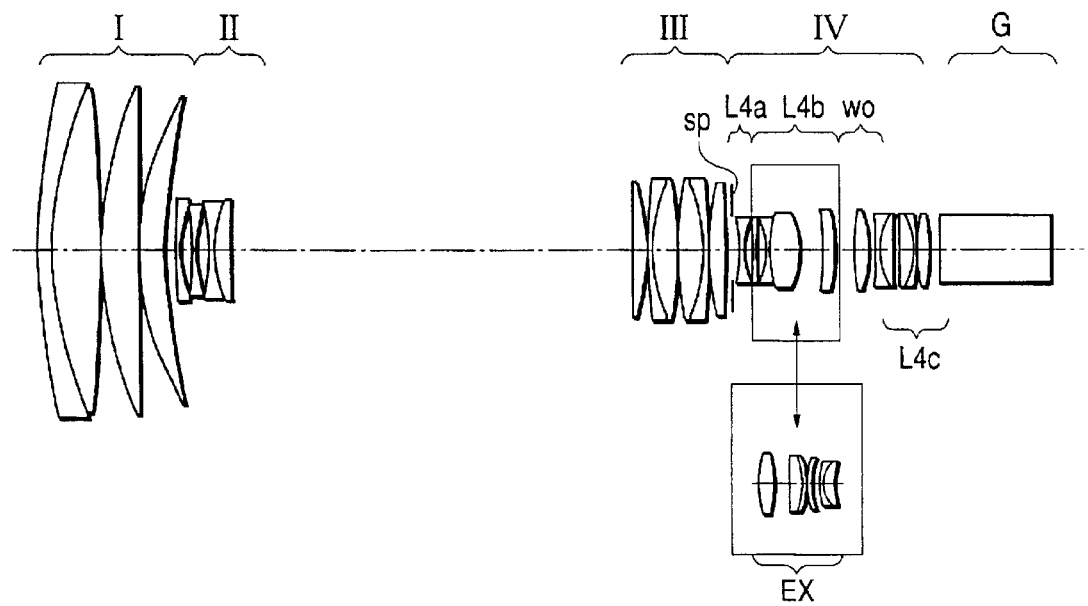
FIG. 6 is a sectional view of a zoom lens according to the first embodiment of the present invention at the wide-angle end in the sixth numerical embodiment.

In the numerical embodiment 6 shown in FIG. 6, the sixth lens of the fourth unit from the image side is used as a wobbling unit lens, and the extender EX can be inserted/removed in/from a space with d34=45.2 mm.

In the numerical embodiment 6, unlike in the numerical embodiments 1 to 5, an optical system is placed in the space in the fourth unit, in/from which the extender EX is inserted/removed, instead of setting a large space as an air gap at the time of 1×, and the optical system at the time of 1× is retracted (ejected) from the optical axis upon insertion of the extender.

In this case as well, by setting the refractive power of the lens unit L4b within an appropriate range, an image height change ratio can be suppressed low regardless of the insertion/removal of the extender EX.

In each numerical embodiment described above, the lens units located closer to the object side than the extender EX are fixed regardless of insertion/removal of the extender EX. By placing an optical system at the time of 1× and insertion of the extender, the degree of freedom in design increases, and high optical performance with a low image height change ratio can be realized.

Figure 17:
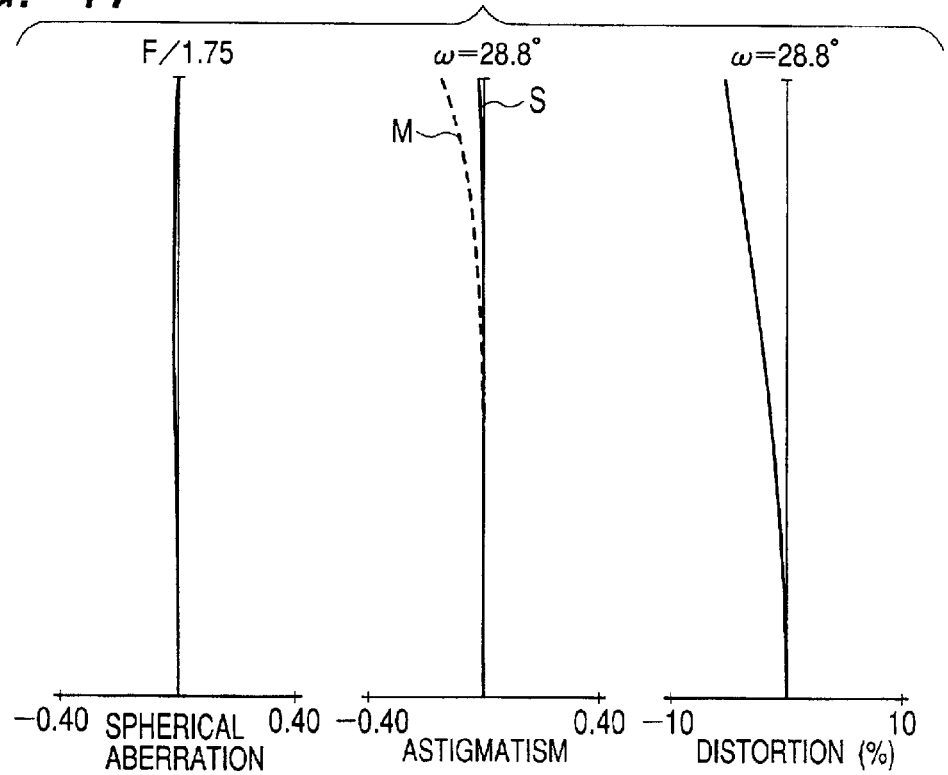
FIG. 17 is an aberration diagram at the wide-angle end in the sixth numerical embodiment.
Figure 18:
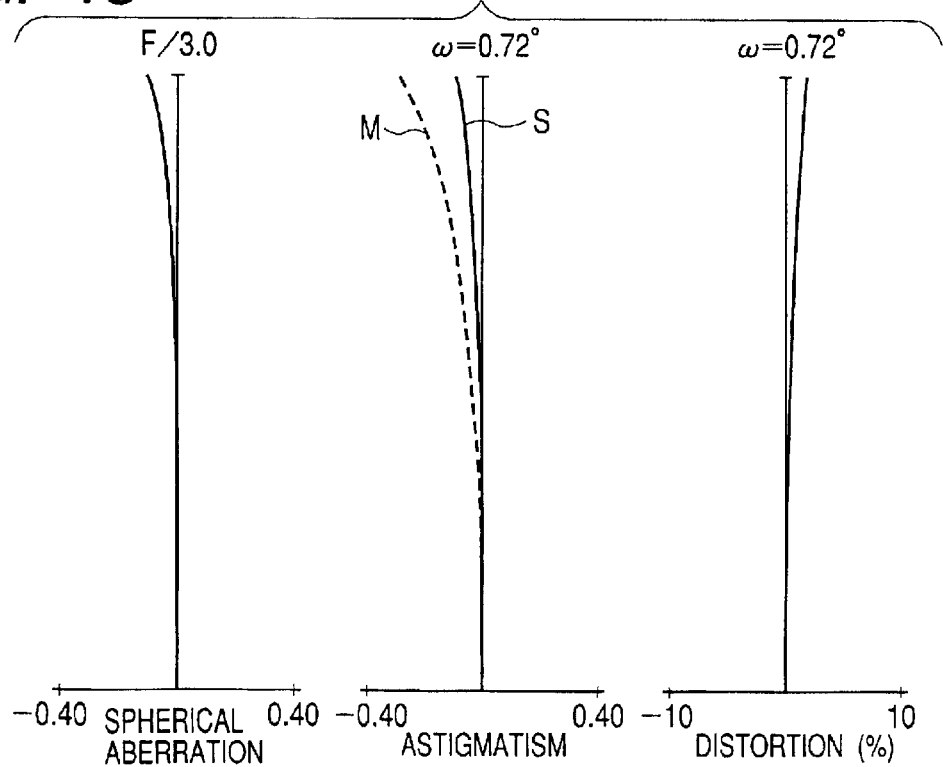
FIG. 18 is an aberration diagram at the telephoto end in the sixth numerical embodiment.
Figure 24:
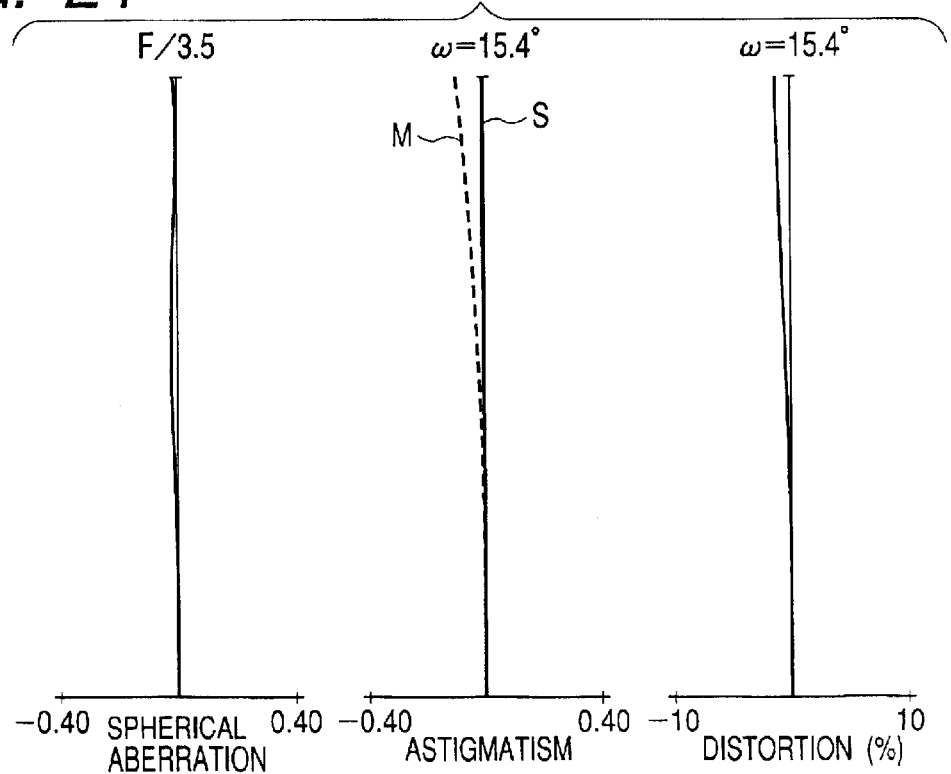
FIG. 24 is an aberration diagram at the wide-angle end in the sixth numerical embodiment at the time of insertion of the extender.

FIGS. 17 and 18 are aberration diagrams at the wide-angle end and telephoto end without insertion of the extender in the numerical embodiment 6. FIG. 24 is an aberration diagram at the wide-angle end with insertion the extender.

As described above, according to this embodiment, there is provided a zoom lens suitable for a TV camera, video camera, or the like, which has a large aperture of an F-number of about 1.8 to 2 and a high magnification ratio of 10× or more, exhibits a small change in imaging magnification accompanying wobbling regardless of insertion/removal of an optical system such as the extender EX in the relay unit, and has excellent optical performance throughout the entire magnification change range.

(Second Embodiment)

A photographing system (TV camera system) using one of the zoom lenses in the numerical embodiments 1 to 6 as a photographing optical system will be described next with reference to FIG. 25.

Figure 25:
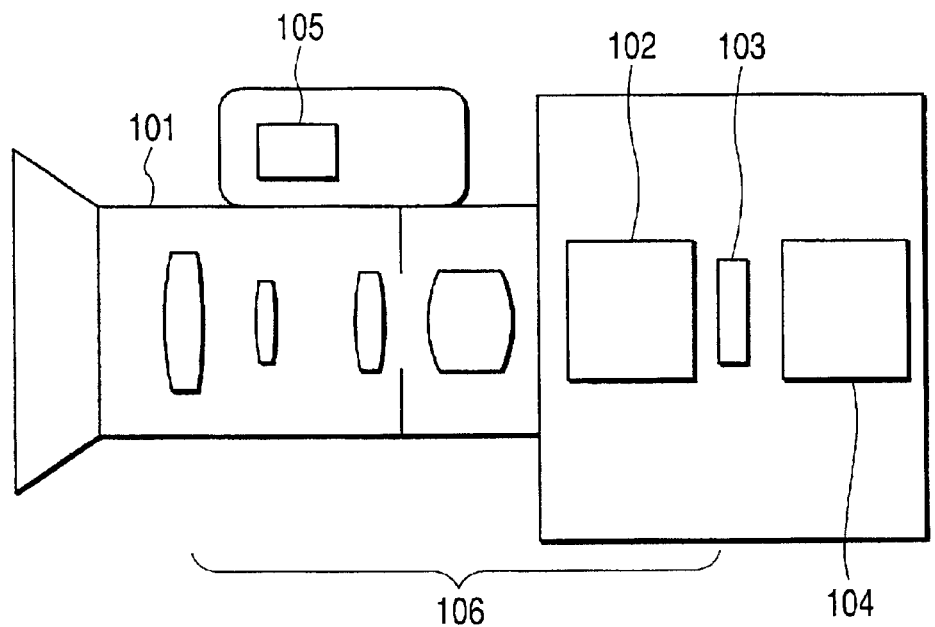
FIG. 25 is a view showing the arrangement of a photographing system using the zoom lens according to the first embodiment as a photographing optical system.

Referring to FIG. 25, this photographing system includes a photographing system body 106 including lenses, a photographing optical system 101 formed by one of the zoom lenses in the numerical embodiments 1 to 6, a glass block 102 corresponding to a filter or color separation prism, an image pickup element 103 such as a CCD for receiving an object image formed by the photographing optical system 101, and CPUs 104 and 105 for controlling the photographing system and lenses.

By using one of the zoom lenses in the numerical embodiments 1 to 6 for a photographing system such as a TV camera, a photographing system can be realized, in which a change in imaging magnification upon slight amplitude driving of a wobbling unit wo in the optical axis direction for autofocus operation is small regardless of whether an extender EX is inserted/removed, i.e., poor screen display can be prevented.

The present invention is not limited to the zoom lenses shown in FIGS. 1 to 6. A lens unit other than the lens units shown in FIGS. 1 to 6 may be added to the zoom lens.

Figure 26:
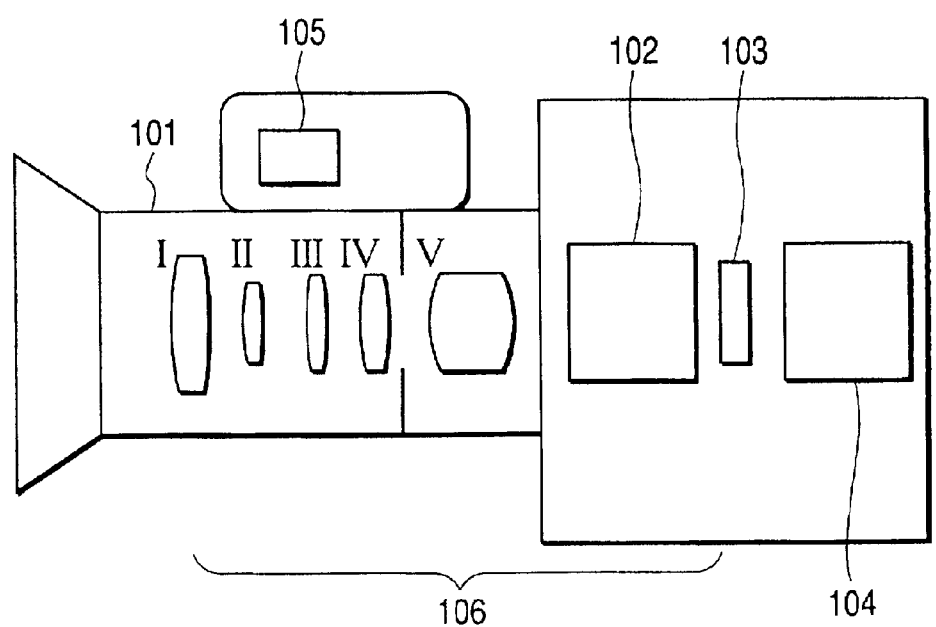
FIG. 26 is view showing a photographing system according to another embodiment of the present invention.

For example, as shown in FIG. 26, the lens unit may be constituted by I, II, III, IV, and V units. The same reference numerals as in FIG. 26 denote the same parts in FIG. 25.

As has been described above, according to the present invention, a change in imaging magnification caused when the wobbling unit is slightly amplitude-driven in the optical axis direction can be suppressed small regardless of the insertion/removal of the magnification changing optical unit.

Note that if conditional expression (1) is satisfied, a change in imaging magnification accompanying wobbling without insertion of the magnification changing optical unit can be sufficiently suppressed small.

If conditional expression (2) is satisfied, a change in imaging magnification accompanying wobbling with insertion of the magnification changing optical unit can be sufficiently suppressed small.

If conditional expression (3) is satisfied, a change in incident angle on the wobbling unit upon insertion/removal of the magnification changing optical unit can be made

TABLE 12

|  | Embodiment 1 | Embodiment 2 | Embodiment 3 | Embodiment 4 | Embodiment 5 | Embodiment 6 |
|---|---|---|---|---|---|---|
| Conditional Expression (1) | 0.27 | 0.14 | 0.14 | 0.16 | 0.52 | 0.08 |
| Conditional Expression (2) | 0.14 | 0.45 | 0.49 | 0.54 | 2.06 | 0.64 |
| Conditional Expression (3) | 0.0000 | 0.0008 | 0.0008 | −0.0005 | 0.0013 | 0.0002 |
| Rate of change (%) in Imaging Magnification | −0.01 | 0.00 | 0.00 | 0.01 | 0.01 | 0.00 |
| Rate of change (%) in Imaging Magnification Upon Insertion of Extender Portion | 0.01 | 0.02 | 0.03 | 0.05 | 0.10 | 0.04 | small. This makes it possible to reduce a change in imaging magnification more reliably.

Note that if the wobbling unit is placed closest to the image side in the fourth unit, a reduction in the size and weight of the wobbling unit to be slightly amplitude-driven can be attained.

If this system is designed to retract part of the fourth unit from the optical axis by inserting the magnification changing optical unit, a large space for the insertion of the magnification changing optical unit can be ensured while a reduction in the overall size of the zoom lens is attained. This makes it possible to suppress a deterioration in optical performance at the time of insertion of the magnification changing optical unit.

What is claimed is:

1. A zoom lens in/from which a magnification changing optical unit for changing an overall focal length of said zoom lens can be inserted/removed, characterized in that
   a wobbling unit which can be amplitude-driven in an optical axis direction to detect a best imaging position is placed closer to an image side than an insertion position of said magnification changing optical unit and
   a light amount adjustment stop is placed closer to the object side than said magnification changing optical unit.

2. A lens according to claim 1, wherein said zoom lens sequentially includes, from an object side, a first unit which is fixed in magnification changing operation and has a positive refractive power, a second unit which moves in the optical axis direction in magnification changing operation and has a negative refractive power, a third unit for correcting an image plane fluctuation accompanying magnification changing operation, and a fourth unit having a positive refractive power for imaging, and a magnification changing optical unit which changes the overall focal length of said zoom lens can be inserted/removed in/from said fourth unit.

3. A photographing system comprising said zoom lens defined in claim 1 and a camera on which said zoom lens is mounted.

4. A zoom lens sequentially comprising, from an object side:
   a first unit which is fixed in magnification changing operation and has a positive refractive power;
   a second unit which moves in the optical axis direction in magnification changing operation and has a negative refractive power;
   a third unit for correcting an image plane fluctuation accompanying magnification changing operation;
   a fourth unit having a positive refractive power for imaging;
   a magnification changing optical unit which changes the overall focal length of said zoom lens can be inserted/removed in/from said fourth unit; and
   a wobbling unit which can be amplitude-driven in an optical axis direction to detect a best imaging position is placed closer to an image side than an insertion position of said magnification changing optical unit,
   wherein a light amount adjustment stop is placed closer to the object side than said magnification changing optical unit, and wherein when said wobbling unit is placed in said fourth unit and amplitude-driven to make an amplitude halfwidth of a backfocus change amount become ½ a depth of focus, $$|\alpha1(S1-E1)/fw1|<0.6$$

is satisfied, where α1 is an angle of an off-axis principal ray incident on an object-side principal plane of said wobbling unit (without insertion of said magnification changing optical unit), S1 is a distance to said stop viewed from the object-side principal plane of said wobbling unit (without insertion of said magnification changing optical unit), E1 is a distance to an image pickup plane viewed from an image-side principal plane of said wobbling unit (without insertion of said magnification changing optical unit), and fw1 is a focal length at a wide-angle end without insertion of said magnification changing optical unit.

5. A lens according to claim 4, wherein when said wobbling unit is placed in said fourth unit amplitude-driven to make an amplitude halfwidth of a backfocus change amount become ½ a depth of focus, $$|\alpha2(S2-E2)fw2|<2.2$$

is satisfied, where α2 is an angle of an off-axis principal ray incident on the object-side principal plane of said wobbling unit (with insertion of said magnification changing optical unit), S2 is a distance to the stop viewed from the object-side principal plane of said wobbling unit (with insertion of said magnification changing optical unit), E2 is a distance to the image pickup plane viewed from the image-side principal plane of said wobbling unit (with insertion of said magnification changing optical unit), and fw2 is a focal length at the wide-angle end with insertion of said magnification changing optical unit.

6. A lens according to claim 4, wherein in said fourth unit, $$-0.001<\phi4b/Im<0.0015$$

is satisfied, where $\phi4b$ is a refractive power of a lens unit located immediately before said wobbling unit in said fourth unit, and Im is an image size of an image pickup element.

7. A lens according to claim 4, wherein said wobbling unit is placed closest to the image side in said fourth unit.

8. A lens according to claim 4, wherein part of said fourth unit is retracted on the optical axis by inserting said magnification changing optical unit.

9. A lens according to claim 4, wherein an optical system for macro photographing and flange-back adjustment is placed closer to the image side than said wobbling unit in said fourth unit, and said optical system can integrally move in macro photographing and flange-back adjustment.

10. A lens according to claim 4, wherein an optical system for macro photographing and flange-back adjustment is placed closer to the image side than said wobbling unit in said fourth unit, and said optical system comprises a lens unit fixed in macro photographing and flange-back adjustment and a lens unit which can move in macro photographing and flange-back adjustment.

11. A lens according to claim 4, wherein an amplitude halfwidth of the wobbling unit before/after insertion of said magnification changing optical unit is $$\Delta x_2 = F \cdot \Delta x_1$$

where $\Delta x_1$ is an amplitude halfwidth of the wobbling unit before insertion of the magnification changing optical unit, $\Delta x_2$ is an amplitude halfwidth of the wobbling unit after insertion of the magnification changing optical unit, and F is a rate of change of F-number due to insertion/removal of the magnification changing optical unit.

12. A photographing system comprising said zoom lens defined in claim 4, and a camera on which said zoom lens is mounted.

13. A zoom lens sequentially comprising, from an object side:
   a first unit which is fixed in magnification changing operation and has a positive refractive power;

a second unit which moves in the optical axis direction in magnification changing operation and has a negative refractive power;

a third unit for correcting an image plane fluctuation accompanying magnification changing operation;

a fourth unit having a positive refractive power for imaging;

a magnification changing optical unit which changes the overall focal length of said zoom lens can be inserted/removed in/from said fourth unit; and a wobbling unit which can be amplitude-driven in an optical axis direction to detect a best imaging position is placed closer to an image side than an insertion position of said magnification changing optical unit, wherein a light amount adjustment stop is placed closer to the object side than said magnification changing optical unit and wherein when said wobbling unit is placed in said fourth unit amplitude-driven to make an amplitude halfwidth of a backfocus change amount become ½ a depth of focus, $|\alpha 2(S2-E2)/fw2|<2.2$ is satisfied, where $\alpha 2$ is an angle of an off-axis principal ray incident on the object-side principal plane of said wobbling unit (with insertion of said magnification changing optical unit), S2 is a distance to the stop viewed from the object-side principal plane of said wobbling unit (with insertion of said magnification changing optical unit), E2 is a distance to the image pickup plane viewed from the image-side principal plane of said wobbling unit (with insertion of said magnification changing optical unit), and fw2 is a focal length at the wide-angle end with insertion of said magnification changing optical unit.

14. A lens according to claim 13, wherein in said fourth unit, $0.001<\phi 4b/Im<0.0015$ is satisfied, where $\phi 4b$ is a refractive power of a lens unit located immediately before said wobbling unit in said fourth unit, and Im is an image size of an image pickup element.

15. A lens according to claim 13, wherein said wobbling unit is placed closest to the image side in said fourth unit.

16. A lens according to claim 13, wherein part of said fourth unit is retracted on the optical axis by inserting said magnification changing optical unit.

17. A lens according to claim 13, wherein an optical system for macro photographing and flange-back adjustment is placed closer to the image side than said wobbling unit in said fourth unit, and said optical system can integrally move in macro photographing and flange-back adjustment.

18. A lens according to claim 13, wherein an optical system for macro photographing and flange-back adjustment is placed closer to the image side than said wobbling unit in said fourth unit, and said optical system comprises a lens unit fixed in macro photographing and flange-back adjustment and a lens unit which can move in macro photographing and flange-back adjustment.

19. A lens according to claim 13, wherein an amplitude halfwidth of the wobbling unit before/after insertion of said magnification changing optical unit is $\Delta x_2 = F \cdot \Delta x_1$ where $\Delta x_1$ is an amplitude halfwidth of the wobbling unit before insertion of the magnification changing optical unit, $\Delta x_2$ is an amplitude halfwidth of the wobbling unit after insertion of the magnification changing optical unit, and F is a rate of change of F-number due to insertion/removal of the magnification changing optical unit.

20. A photographing system comprising said zoom lens defined in claim 13, and a camera on which said zoom lens is mounted.

* * * * *